United States Patent
Kotani

(10) Patent No.: US 10,336,201 B2
(45) Date of Patent: Jul. 2, 2019

(54) CONTACTLESS POWER TRANSMISSION SYSTEM

(71) Applicant: DAIHEN Corporation, Osaka-shi, Osaka (JP)

(72) Inventor: Hiroyuki Kotani, Osaka (JP)

(73) Assignee: DAIHEN Corporation, Osaka (JP)

(*) Notice: Subject to any disclaimer, the term of this patent is extended or adjusted under 35 U.S.C. 154(b) by 8 days.

(21) Appl. No.: 15/345,902

(22) Filed: Nov. 8, 2016

(65) Prior Publication Data

US 2017/0129347 A1   May 11, 2017

(30) Foreign Application Priority Data

Nov. 11, 2015 (JP) ................................. 2015-221535

(51) Int. Cl.
*B60L 11/18* (2006.01)
*H02J 50/90* (2016.01)
(Continued)

(52) U.S. Cl.
CPC ............ *B60L 11/182* (2013.01); *B60L 53/12* (2019.02); *B60L 53/22* (2019.02); *B60L 53/36* (2019.02);
(Continued)

(58) Field of Classification Search
CPC .. H02J 5/005; H02J 1/00; H02J 7/0027; H02J 50/12; H02J 7/025; H02J 50/90;
(Continued)

(56) References Cited

U.S. PATENT DOCUMENTS 5,831,348 A * 11/1998 Nishizawa ........... G06K 7/0008
                                                       307/104
2007/0296506 A1* 12/2007 Mizutani ................... H03F 1/14
                                                        330/302
(Continued)

FOREIGN PATENT DOCUMENTS

DE   10 2013 000900 A1   7/2014
EP      2 555 377 A1     2/2013
(Continued)

OTHER PUBLICATIONS

Partial European Search Report, issued in corresponding European Patent application, dated May 22, 2017 (15 pages).
(Continued)

*Primary Examiner* — Daniel Kessie
*Assistant Examiner* — Terrence R Willoughby
(74) *Attorney, Agent, or Firm* — Hamre, Schumann, Mueller & Larson, P.C.

(57) ABSTRACT

A contactless power transmission system is provided for supplying power contactlessly from a power transmission apparatus to a power reception apparatus. The power transmission apparatus includes a high-frequency power source device for outputting a constant high-frequency current, and power transmission units having serial resonance circuits. The power reception apparatus includes power reception units having parallel resonance circuits. A power transmission coil of the power transmission unit and a power reception coil of the power reception unit are magnetically coupled. The power transmission units are connected in series, while the power reception units are connected in parallel. Power is transmitted from the power transmission unit to the power reception unit by magnetic field resonance.

19 Claims, 13 Drawing Sheets

(51) Int. Cl.
  *H02J 50/12* (2016.01)
  *H02J 50/40* (2016.01)
  *H02J 7/00* (2006.01)
  *B60L 53/22* (2019.01)
  *B60L 53/12* (2019.01)
  *B60L 53/38* (2019.01)
  *B60L 53/39* (2019.01)
  *B60L 53/36* (2019.01)

(52) U.S. Cl.
  CPC .............. *B60L 53/38* (2019.02); *B60L 53/39* (2019.02); *H02J 7/0027* (2013.01); *H02J 50/12* (2016.02); *H02J 50/40* (2016.02); *H02J 50/90* (2016.02); *B60L 2210/40* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
  CPC . H02J 17/00; H02J 50/50; H02J 50/40; H04B 5/0025–0093; B60L 11/1812; B60L 11/182; B60L 11/1833; B60L 11/1829–1831; Y02T 90/122; Y02T 10/7005; Y02T 90/125; Y02T 90/12; Y02T 10/7072; Y02T 90/121; Y02T 90/14; Y02T 90/127; H01F 38/14; H01F 2038/143–146
  See application file for complete search history.

(56) References Cited

U.S. PATENT DOCUMENTS

| | | | | |
|---|---|---|---|---|
| 2008/0298100 A1* | 12/2008 | Esaka | ...................... | H01F 38/14 363/67 |
| 2011/0285210 A1* | 11/2011 | Lemmens | ............... | H02J 5/005 307/104 |
| 2012/0038220 A1* | 2/2012 | Kim | ........................ | H02J 7/025 307/104 |
| 2013/0026850 A1* | 1/2013 | Throngnumchai | ... | B60L 11/182 307/104 |
| 2013/0175937 A1* | 7/2013 | Nakajo | ................... | H05B 37/02 315/200 R |
| 2013/0328565 A1* | 12/2013 | Taracila | ............. | G01R 33/3685 324/322 |
| 2014/0175895 A1* | 6/2014 | Ishi | ........................ | H02J 17/00 307/104 |
| 2014/0285016 A1* | 9/2014 | Tetu | ...................... | H02J 7/0027 307/31 |
| 2014/0361633 A1* | 12/2014 | Abe | ........................ | H01F 38/14 307/104 |
| 2016/0028241 A1* | 1/2016 | Ichikawa | ................ | H02J 5/005 307/9.1 |
| 2016/0049800 A1* | 2/2016 | Tanaka | .................... | H02J 5/005 307/104 |
| 2016/0079796 A1* | 3/2016 | Jeong | .................... | H02J 7/0013 320/108 |
| 2017/0093219 A1* | 3/2017 | Su | .......................... | H02J 50/12 |

FOREIGN PATENT DOCUMENTS

| | | | |
|---|---|---|---|
| JP | 8-149723 A | | 6/1996 |
| JP | 2000-134829 A | | 5/2000 |
| JP | 2007089279 | * | 9/2005 |
| JP | 2007-89279 A | | 4/2007 |
| JP | 4293854 B2 | | 7/2009 |
| WO | 2014/178345 A1 | | 11/2014 |

OTHER PUBLICATIONS

Duong et al. "A Dynamically Adaptable Impedance-Matching System for Midrange Wireless Power Tranfer with Misalignment"; Energies, vol. 8, No. 8, pp. 7593-7617, Jul. 27, 2015.

Prasanth, "Wireless Power Transfer for E-Mobility", Jul. 31, 2012, Retrieved from the Internet: URL: https://pdfs.semanticscholar.org/55375462a16469a35fe274c4b41195af902cd21f.pdf, retrieved Jul. 4, 2018.

Office Action received in corresponding European Patent Application, dated Jul. 12, 2018 (9 pages).

* cited by examiner

CONTACTLESS POWER TRANSMISSION SYSTEM

BACKGROUND OF THE INVENTION

1. Field of the Invention

The present invention relates to a contactless power transmission system that performs power transmission contactlessly.

2. Description of Related Art

A technique has been developed in which power output by a power source is transmitted contactlessly to a load without the load and the power source being directly connected. This technique is commonly called contactless power transmission or wireless power supply. This technique has been adapted for supplying power to mobile phones, household appliances, electric automobiles, automated guided vehicles (AGVs), and the like.

With contactless power transmission, power is transmitted contactlessly from a power transmission apparatus connected to a high-frequency power source device, to a power reception apparatus connected to a load. A power transmission coil is included in the power transmission apparatus, and a power reception coil is provided in the power reception apparatus. Contactless power transmission is performed due to the power transmission coil and the power reception coil being magnetically coupled.

In the case where the load is a DC load such as a battery, a rectifying circuit is included in the power reception apparatus, and the AC current output from the power reception coil is converted into a DC current by the rectifying circuit. If the AC current output from the power reception coil is large, the current that flows in the diodes included in the rectifying circuit increases, and the diodes break down in some cases. In order to distribute the current that flows in the diodes, it is conceivable to use multiple diodes connected in parallel. However, if the AC current output from the power reception coil is a high-frequency current of 6.78 MHz to 40.68 MHz, it is difficult to balance the current that flows in the diodes connected in parallel due to the influence of the impedance of the wires, and the like, and therefore it is difficult to realize parallel connection.

In the case of using a rectifying circuit in which diodes are not connected in parallel, in order to suppress the current that flows in the rectifying circuit, there is a method of providing multiple power reception coils in the power reception apparatus and connecting rectifying circuits to the respective power reception coils. In this case, the power output by the high-frequency power source device is received by being distributed to the multiple power reception coils, and therefore the current that flows in the rectifying circuits can be dispersed. For example, Japanese Patent No. 4293854 discloses a contactless power supply apparatus that includes multiple power reception units each including a resonance circuit composed of a power reception coil and a resonance capacitor, a rectifying circuit, and a smoothing circuit, the outputs of the power reception units being connected in parallel and output to a load.

However, in the case of using the contactless power supply apparatus disclosed in Japanese Patent No. 4293854, the power reception units are equivalent to (i.e., serve as) constant voltage sources, and therefore in order to supply the output power of the power reception units to the load, the output voltages of the power reception units need to be made approximately the same. Accordingly, the specifications of the power transmission units and the specifications of the power reception units need to be the same. Also, the coupling coefficient for the power transmission coil and the power reception coil needs to be the same in each power reception unit. However, if the positional relationship (e.g., distance or the like) between the power transmission coils and the power reception coils changes, the coupling coefficients also change.

SUMMARY OF THE INVENTION

The present invention has been proposed under the foregoing circumstances, and it is an object thereof to provide a contactless power transmission system according to which power can be supplied appropriately from the power reception units to the load, even if the specifications and coupling coefficients of the power transmission units and the power reception units are different or vary.

A contactless power transmission system provided according to an aspect of the present invention is a contactless power transmission system for transmitting power contactlessly from a power transmission apparatus to a power reception apparatus. The power transmission apparatus includes: a high-frequency power source device that outputs a constant high-frequency current; and a plurality of power transmission units that are connected to each other in series and each include a power transmission coil and a resonance capacitor connected in series to the power transmission coil. The power reception apparatus includes a plurality of power reception units respectively associated with the plurality of power transmission units, and outputs of the plurality of power reception units are connected in parallel and outputted to a load. The plurality of power reception units each include a power reception coil that is to be magnetically coupled to a power transmission coil of a corresponding one of the power transmission units, and a resonance capacitor that is connected to the power reception coil. The transmitting of power from the power transmission units to the power reception units may be performed by magnetic field resonance, for example.

According to the above aspect of the present invention, the high-frequency power source device outputs a constant current of high-frequency to the power transmission units, where power is transmitted from the power transmission units to the power reception units using magnetic field resonance. Thus, the power reception units become equivalent to constant current sources. Accordingly, the currents outputted by the power reception units can readily be added together and supplied to the load. This makes it possible to appropriately supply power from the power reception units to the load, even if the specifications of the power transmission/reception units are different and the coupling coefficients are different.

Other characteristics and advantages of the present invention will become apparent from the detailed description given below with reference to the accompanying drawings.

DESCRIPTION OF THE PREFERRED EMBODIMENTS

Hereinafter, embodiments of the present invention will be described in detail with reference to the drawings taking, as an example, the case where a contactless power transmission system according to the present invention is used as a charging system for an electric automobile.

Figure 1:
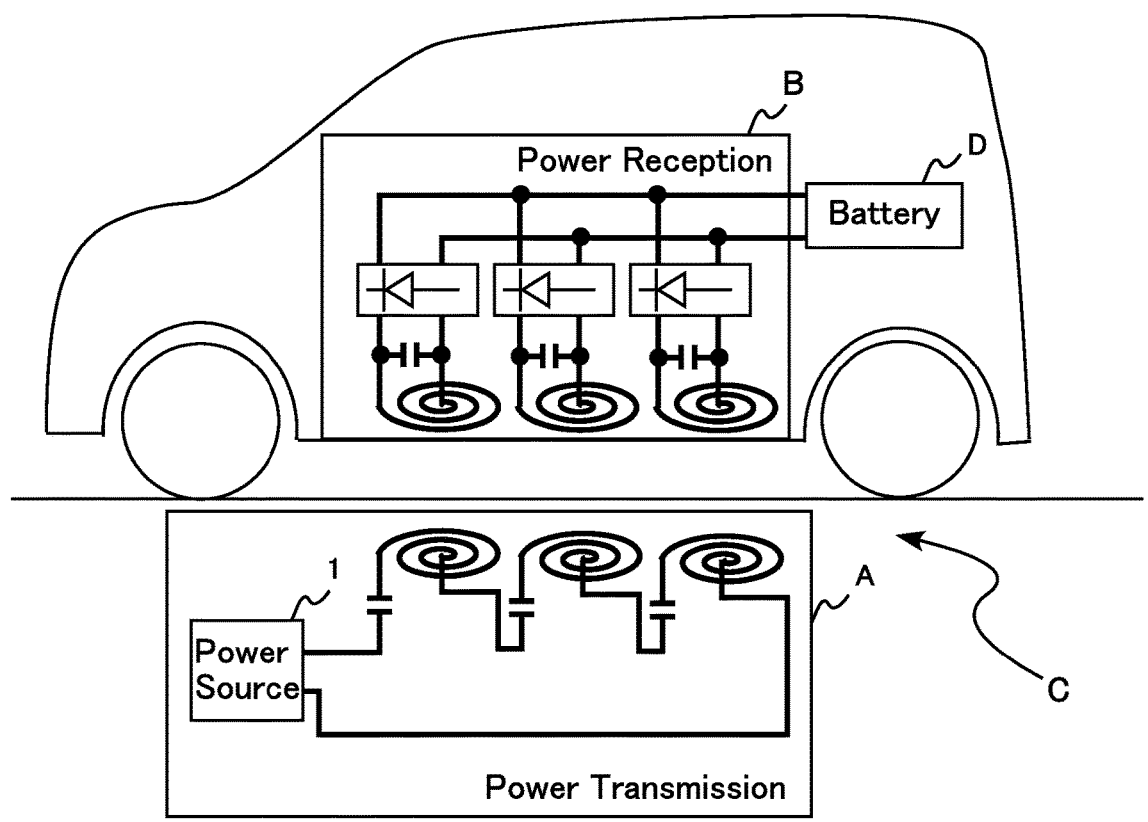
FIG. 1 is a diagram showing an overall configuration of a contactless power transmission system according to a first embodiment.
Figure 2:
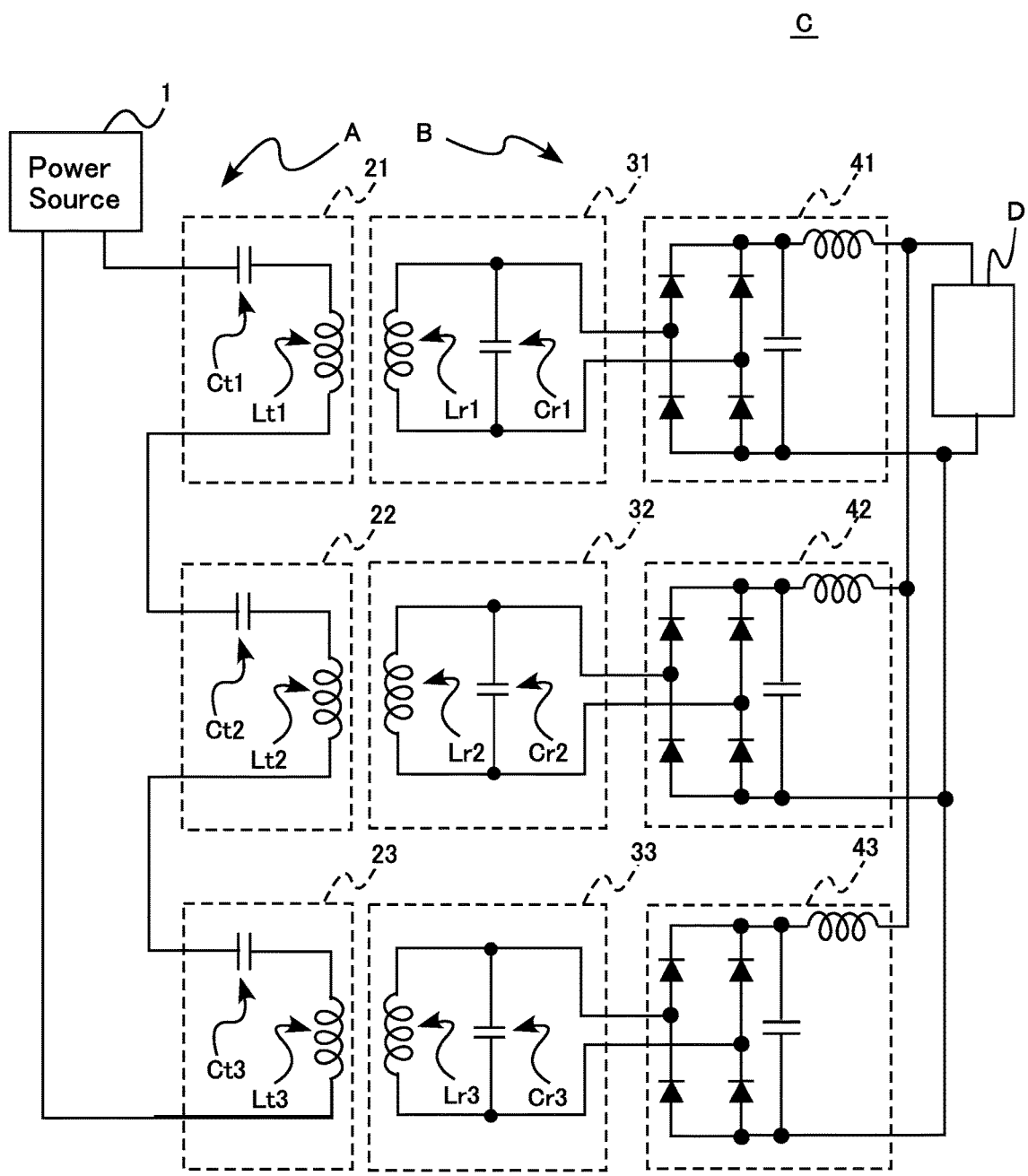
FIG. 2 is a circuit diagram showing the contactless power transmission system shown in FIG. 1.
Figure 3:
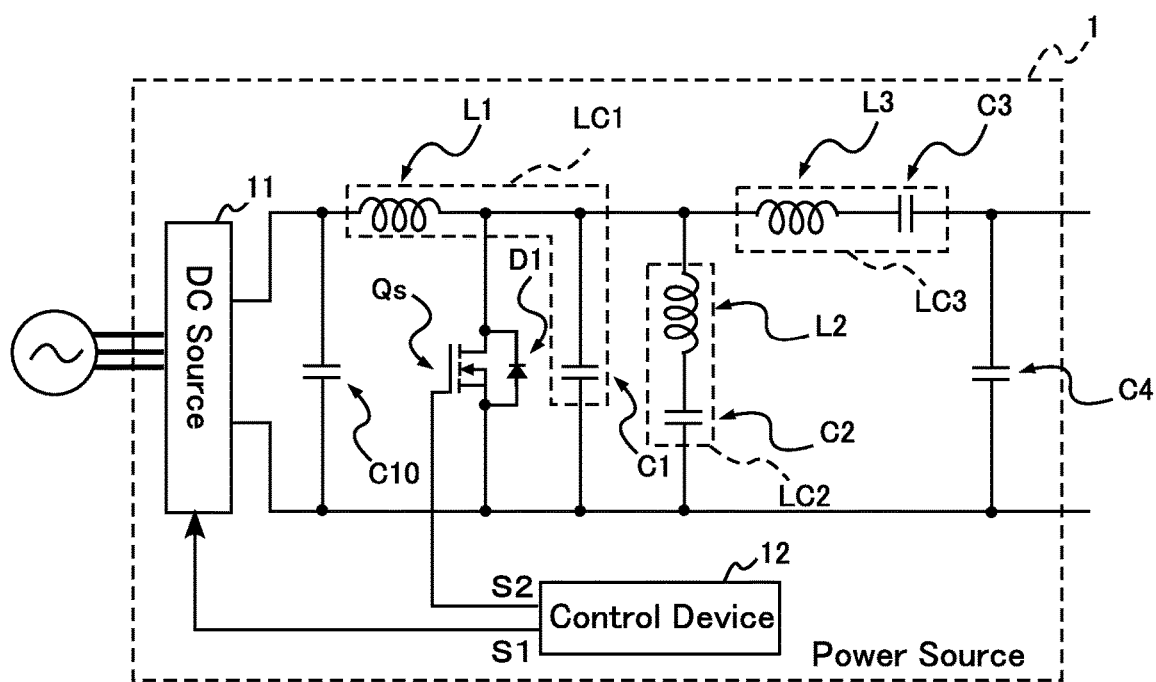
FIG. 3 is a circuit diagram showing details of an internal configuration of a high-frequency power source device.

FIGS. 1 to 3 are diagrams for illustrating a contactless power transmission system C according to a first embodiment. FIG. 1 is a drawing showing an overall configuration of the contactless power transmission system C. FIG. 2 is a circuit diagram showing the contactless power transmission system C shown in FIG. 1. FIG. 3 is a circuit diagram showing details of an internal configuration of a high-frequency power source device 1.

As shown in FIG. 1, the contactless power transmission system C is a power supply system for charging a battery D for an electric automobile or the like, and includes a power reception apparatus B provided in a vehicle body of an electric automobile, and a power transmission apparatus A that is provided embedded in a floor surface of a parking area or the like. The power transmission apparatus A includes power transmission coils that are arranged in the floor surface, and the power reception apparatus B includes power reception coils that are arranged on the vehicle body bottom surface. The power transmission coils and the power reception coils are magnetically coupled, whereby the power reception apparatus B receives high-frequency power transmitted from the power transmission apparatus A. That is, due to high-frequency current flowing in the power transmission coils, magnetic flux changes, and high-frequency currents flow in the power reception coils that the magnetic flux crosses. Accordingly, power can be supplied contactlessly from the power transmission apparatus A to the power reception apparatus B. The power reception apparatus B rectifies the high-frequency currents using rectifying/smoothing circuits and supplies the resulting currents to the battery D.

The power transmission coils and power reception coils are planar coils wound in the form of spirals and are arranged such that the coil plane is approximately parallel to the floor surface. Note that the shapes of the power transmission coils and the power reception coils are not limited. In the present embodiment, the power transmission apparatus A includes three power transmission coils, and the power reception apparatus B includes three power reception coils. In the case of supplying power, as shown in FIG. 1, the vehicle body is arranged such that the power reception apparatus B is directly above the power transmission apparatus A and the power reception coils overlap with respective corresponding power transmission coils in a view from above. FIG. 2 shows a state in which the power reception coils are magnetically coupled to the respective corresponding power transmission coils.

As shown in FIG. 2, the power transmission apparatus A includes a high-frequency power source device 1 and power transmission units 21, 22, and 23.

The high-frequency power source device 1 supplies high-frequency power to the power transmission units 21, 22, and 23. The high-frequency power source device 1 is a so-called constant current source, and outputs a high-frequency current of a constant size. As shown in FIG. 3, the high-frequency power source device 1 includes a DC power source device 11, a power source control device 12, a switching element Qs, a diode D1, inductors L1, L2, and L3, and capacitors C1, C2, C3, C4, and C10. The high-frequency power source device 1 converts the DC power generated by the DC power source device 11 into high-frequency power through an operation of switching the switching element Qs, and outputs the resulting high-frequency power.

The DC power source device 11 generates and outputs DC power. The DC power source device 11 uses a rectifying circuit (not shown) to rectify an AC voltage (e.g., commercial voltage of 200 [V], or the like) input from a commercial power source and uses a smoothing circuit (not shown) to smooth the resulting voltage, thereby performing conversion into a DC voltage. Also, the DC power source device 11 uses a DC-DC converter (not shown) to perform conversion into a DC voltage of a predetermined level (target voltage). The DC power source device 11 uses a voltage control signal S1 input from the power source control device 12 to control the conversion operation of the DC-DC converter, and thereby converts the DC voltage resulting from rectifying and smoothing into a DC voltage of a predetermined level. Note that there is no limitation on the configuration of the DC power source device 11, and the DC power source device 11 need only output a predetermined DC voltage.

The switching element Qs, diode D1, inductors L1 and L3, and capacitors C1, C3, C4, and C10 constitute a circuit similar to a so-called class E amplifier. The class E amplifier receives input of the DC power from the DC power source device 11, and generates and outputs high-frequency power.

The capacitor C10 is connected in parallel to the DC power source device 11 and smoothes the DC voltage input from the DC power source device 11.

The inductor L1 is connected in series between the output terminal on the high potential side of the DC power source device 11 and the switching element Qs. Due to the DC power source device 11 outputting a constant DC voltage, the inductor L1 supplies a constant DC current to the switching element Qs.

The switching element Qs switches between an on state and an off state according to a high-frequency control signal S2 input from the power source control device 12. In the present embodiment, a MOSFET (Metal Oxide Semiconductor Field Effect Transistor) is used as the switching element Qs. Note that the switching element Qs is not limited to being a MOSFET, and may be a bipolar transistor, an IGBT (Insulated Gate Bipolar Transistor), or the like. The drain terminal of the switching element Qs is connected to one terminal (terminal different from the one connected to the output terminal of the DC power source device 11) of the inductor L1. The source terminal of the switching element Qs is connected to the output terminal on the low potential side of the DC power source device 11. The gate terminal of the switching element Qs receives input of the high-frequency control signal S2 from the power source control device 12. The high-frequency control signal S2 is a pulse signal that repeats a high level and a low level at a predetermined frequency $f_0$ (e.g., 85 [kHz], 13.56 [MHz], or the like). Because the frequency $f_0$ is the frequency at which the switching element Qs is switched, it is written as "switching frequency $f_0$" hereinafter in some cases. The switching element Qs enters the off state when the high-frequency control signal S2 is at the low level, and enters the on state when the high-frequency control signal S2 is at the high level.

The diode D1 is a so-called flywheel diode and is connected in reverse parallel between the drain terminal of the switching element Qs and the source terminal. That is, the anode terminal of the diode D1 is connected to the source terminal of the switching element Qs, and the cathode terminal of the diode D1 is connected to the drain terminal of the switching element Qs. The diode D1 is for preventing a high voltage in the reverse direction caused by a counter-electromotive force generated due to the switching of the switching element Qs from being applied to the switching element Qs. Note that if the switching element Qs has a function of performing the operation of the diode in its interior, it is possible to not provide the diode D1.

The capacitor C1 is connected in parallel to the switching element Qs and accumulates electrical energy due to current flowing when the switching element Qs is in the off state. Also, after the voltage across the capacitor C1 reaches its peak, the capacitor C1 discharges the electrical energy. Also, the switching element Qs switches from the off state to the on state at the timing when the voltage across the capacitor C1 reaches zero.

The inductor L3 and the capacitor C3 are connected in series so as to constitute a resonance circuit LC3. The inductor L3 and the capacitor C3 are designed such that the resonant frequency matches the switching frequency $f_0$. The resonance circuit LC3 is connected in series between the connection point of the drain terminal of the switching element Qs and one terminal of the inductor L1, and the power transmission unit 21. Due to the resonance characteristic of the resonance circuit LC3, the output current is in the form of a sine wave with the resonant frequency (switching frequency $f_0$). Note that the resonance circuit LC3 corresponds to a "first resonance circuit" of the present invention.

The capacitor C4 is connected to the output side of the resonance circuit LC3 so as to be in parallel with the DC power source device 11. The capacitor C4, inductor L3, and capacitor C3 function as an impedance matching circuit.

Also, the capacitor C3 cuts the DC component from the high-frequent current output from the high-frequency power source device 1.

According to the configuration above, the class E amplifier including the switching element Qs, diode D1, inductors L1 and L3, and capacitors C1, C3, C4, and C10 generates and outputs a high-frequency current with the switching frequency $f_0$ due to the switching element Qs switching according to the high-frequency control signal S2 input from the power source control device 12.

Also, in the present embodiment, in the high-frequency power source device 1, the resonance circuit LC2 in which the inductor L2 and the capacitor C2 are connected in series is connected in parallel to the switching element Qs. The inductor L2 and the capacitor C2 are designed such that the resonant frequency matches a frequency that is two times the switching frequency $f_0$. The resonance circuit LC2 has a low impedance with respect to a frequency component (second harmonic component) that is two times the switching frequency $f_0$, and has a high impedance with respect to a component of the switching frequency $f_0$ (fundamental component) and a frequency component (third harmonic component) that is three times the switching frequency $f_0$. Note that the resonance circuit LC2 corresponds to a "second resonance circuit" of the present invention.

In combination with the resonance circuit LC2, a filter LC1 composed of the inductor L1 and the capacitor C1 is also designed so as to have a low impedance with respect to the frequency component (second harmonic component) that is two times the switching frequency $f_0$, and to have a high impedance with respect to the component (fundamental component) of the switching frequency $f_0$ and the frequency component (third harmonic component) that is three times the switching frequency $f_0$. Note that the capacitance of the capacitor C1 is designed with consideration given to the capacitance component inside of the switching element Qs.

According to the configuration above, the second harmonic component in the generated high-frequency current flows in the resonance circuit LC2, and thus the voltage generated due to the second harmonic component current between the drain and source of the switching element Qs can be suppressed.

The power source control device 12 controls the high-frequency power source device 1, and is constituted by a microcomputer including a CPU (Central Processing Unit), a ROM (Read Only Memory), and a RAM (Random Access Memory), or an FPGA (Field-Programmable Gate Array).

The power source control device 12 uses feedback control to control the level of the DC voltage output from, the DC power source device 11. Specifically, the power source control device 12 generates a control pulse signal for setting the deviation between the output voltage of the DC power source device 11 and the set target voltage to zero. Also, the control pulse signal is amplified by a drive circuit (not shown) to a level at which the DC-DC converter can be driven, and is output to the DC power source device 11 as the voltage control signal S1. Thus, the power source control device 12 can control the DC voltage output from the DC power source device 11 to a target voltage so as to cause a constant DC voltage to be output from the DC power source device 11. Also, the power source control device 12 changes the level of the output voltage of the DC power source device 11 by changing the target voltage.

Also, based on a reference clock, the power source control device 12 generates a pulse signal (note that a sine wave signal or the like may be used) at the switching frequency $f_0$, amplifies the pulse signal to a level at which the switching element Qs can be driven using the drive circuit (not shown), and outputs the resulting signal to the gate terminal of the switching element Qs as the high-frequency control signal S2.

Note that there is no limitation on the configuration of the high-frequency power source device 1, and it is sufficient that the high-frequency power source device 1 outputs a high-frequency current of a constant size.

The power transmission unit 21 includes a power transmission coil Lt1 and a resonance capacitor Ct1. The power transmission coil Lt1 transmits the high-frequency power supplied by the high-frequency power source device 1 to the power reception apparatus B. The resonance capacitor Ct1 is connected in series to the power transmission coil Lt1 and constitutes a serial resonance circuit.

The power transmission coil Lt1 and the resonance capacitor Ct1 are designed such that the resonant frequency matches the frequency $f_0$ (switching frequency $f_0$) of the high-frequency power supplied by the high-frequency power source device 1. That is, they are designed such that the self-inductance $L_R$ of the power transmission coil Lt1 and the capacitance $C_R$ of the resonance capacitor Ct1 are in the relationship shown in equation (1) below. Note that if the frequency of the high-frequency voltage output by the high-frequency power source device 1 is high, the floating capacitance between the windings of the transmission coil Lt1 may be used as the resonance capacitor Ct1.

$$2\pi f_0 L_R = \frac{1}{2\pi f_0 C_R} \tag{1}$$

The power transmission unit 22 has a configuration similar to that of the power transmission unit 21 and includes a power transmission coil Lt2 and a resonance capacitor Ct2. The power transmission unit 23 also has a configuration similar to that of the power transmission unit 21 and includes a power transmission coil Lt3 and a resonance capacitor Ct3. The power transmission units 21, 22, and 23 are connected in series in the stated order and are connected to the high-frequency power source device 1.

Also, as shown in FIG. 2, the power reception apparatus B includes the power reception units 31, 32, and 33, and rectifying/smoothing circuits 41, 42, and 43.

The power reception unit 31 includes a power reception coil Lr1 and a resonance capacitor Cr1. The power reception coil Lr1 is magnetically coupled to the power transmission coil Lt1 and thereby receives power contactlessly. The resonance capacitor Cr1 is connected in parallel to the power reception coil Lr1 so as to form a parallel resonance circuit.

Similarly to the power transmission coil Lt1 and the resonance capacitor Ct1, the power reception coil Lr1 and the resonance capacitor Cr1 are designed such that the resonant frequency matches the frequency $f_0$ (switching frequency $f_0$) of the high-frequency power supplied by the high-frequency power source device 1. Note that if the switching frequency $f_0$ is high, the floating capacitance between the windings of the power reception coil Lr1 may be used as the resonance capacitor Cr1.

The power reception unit 32 has a configuration similar to that of the power reception unit 31 and includes a power reception coil Lr2 and a resonance capacitor Cr2. The power reception unit 33 also has a configuration similar to that of the power reception unit 31 and includes a power reception coil Lr3 and a resonance capacitor Cr3.

The power transmission unit 21 and the power reception unit 31 are both resonance circuits, and contactless power supply is performed from the power transmission unit 21 to the power reception unit 31 using magnetic field resonance. Also, the power transmission unit 22 and the power reception unit 32 are both resonance circuits, and contactless power supply is performed from the power transmission unit 22 to the power reception unit 32 using magnetic field resonance. Also, the power transmission unit 23 and the power reception unit 33 are both resonance circuits, and contactless power supply is performed from the power transmission unit 23 to the power reception unit 33 using magnetic field resonance. The power received by the power reception units 31 to 33 is output to the rectifying/smoothing circuits 41 to 43.

The rectifying/smoothing circuit 41 is for rectifying the high-frequency current output by the power reception unit 31 so as to convert it into a DC current. The rectifying/smoothing circuit 41 includes a full-wave rectifying circuit obtained by bridge-connecting four diodes. The rectifying/smoothing circuit 41 also includes a smoothing circuit for smoothing the rectified output. Note that there is no limitation on the configuration of the rectifying/smoothing circuit 41, and it is sufficient that the rectifying/smoothing circuit 41 converts the high-frequency current into a DC current. The DC current output from the rectifying/smoothing circuit 41 is supplied to the battery D. The rectifying/smoothing circuit 42 has a configuration similar to that of the rectifying/smoothing circuit 41, rectifies the high-frequency current output by the power reception unit 32 so as to convert it into a DC current, and outputs the DC current to the battery D. The rectifying/smoothing circuit 43 also has a configuration similar to that of the rectifying/smoothing circuit 41, rectifies the high-frequency current output by the power reception unit 33 so as to convert it into a DC current, and outputs the DC current to the battery D. The rectifying/smoothing circuits 41 to 43 are connected in parallel to the battery D. The currents output from the rectifying/smoothing circuits 41 to 43 are added together and supplied to the battery D.

The battery D is a secondary battery such as a lithium ion battery, for example. The battery D is charged by the DC power output by the rectifying/smoothing circuits 41 to 43 and supplies power to a motor (not shown) or the like. The battery D receives input of a current of a constant size, regardless of the charge state of the battery D. Note that there is no limitation on the type of the secondary battery, and it is possible to use a lead storage battery or the like. Also, an electric double layer capacitor or a lithium ion capacitor may be used instead of the battery D.

Next, the adding together of the currents output from the rectifying/smoothing circuits 41 to 43 will be described with reference to FIGS. 4A to 4C.

Figure 4A:
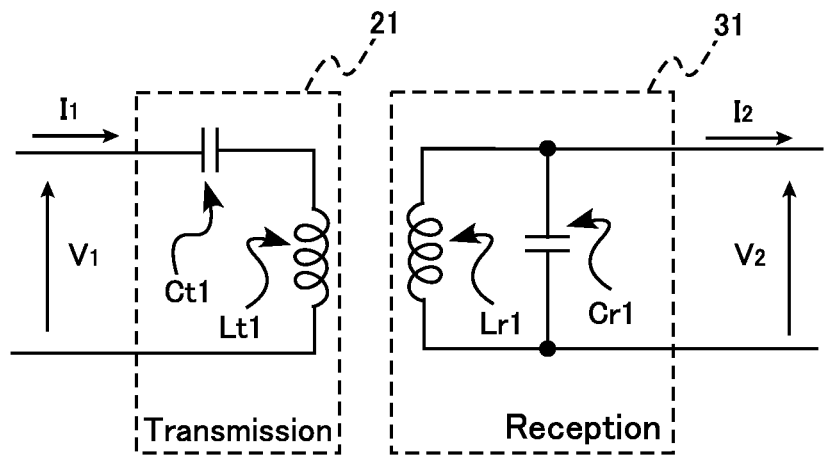
FIGS. 4A to 4C are diagrams illustrating circuits of a portion of the contactless power transmission system shown in FIG. 2 using an equivalent circuit.

In FIG. 4A, only the power transmission unit 21 and the power reception unit 31 in the contactless power transmission system C shown in FIG. 2 are shown.

The voltage to be applied to the power transmission unit 21 is denoted as $V_1$, and the current to be input is denoted as $I_1$. Also, the voltage to be output from the power reception unit 31 is denoted as $V_2$, and the current to be output is denoted as $I_2$. Note that the voltages $V_1$ and $V_2$ and the currents $I_1$ and $I_2$ are all vectors.

In general, an equivalent circuit of the contactless power transmission system can be expressed by replacing the magnetically coupled power transmission coils and power reception coils with a T circuit constituted by three coils. The circuit shown in FIG. 4B is the circuit shown in FIG. 4A upon being converted into an equivalent circuit represented by using a T circuit. In FIG. 4B, as shown in the drawing, the impedances of the capacitors or coils are expressed as Z1 to Z4. Note that the impedances Z1 to Z4 are all vectors. The inductance of the coil on the power transmission unit side (the coil included in the impedance Z1) among the coils in the T circuit is obtained by subtracting the mutual inductance caused by magnetic coupling between a power transmission coil Lt and a power reception coil Lr from the self-inductance of the power transmission coil Lt. The inductance of the coil on the power reception unit side (the coil included in the impedance Z3) among the coils in the T circuit is obtained by subtracting the mutual inductance caused by magnetic coupling between the power transmission coil Lt and the power reception coil Lr from the self-inductance of the power reception coil Lr. Also, the inductance of the coil connected in parallel (coil included in the impedance Z2) among the coils in the T circuit is the mutual inductance caused by magnetic coupling between the power transmission coil Lt and the power reception coil Lr. Accordingly, the impedances Z1 to Z4 can be expressed using equations (2) to (5) below. Note that the self-inductances of the power transmission coil Lt1 and the power reception coil Lr1 are denoted as $L_t$ and $L_r$ respectively, and the capacitances of the resonance capacitor Ct1 and the resonance capacitor Cr1 are denoted as $C_t$ and $C_r$ respectively. Also, the coupling coefficient of the power transmission coil Lt1 and the power reception coil Lr1 is denoted as k.

$$Z1 = \frac{1}{j\omega \cdot C_t} + j\omega\left(L_t - k\sqrt{L_t \cdot L_r}\right) \quad (2)$$

$$Z2 = j\omega k \sqrt{L_t \cdot L_r} \quad (3)$$

$$Z3 = j\omega\left(L_r - k\sqrt{L_t \cdot L_r}\right) \quad (4)$$

$$Z4 = \frac{1}{j\omega \cdot C_r} \quad (5)$$

Figure 4B:
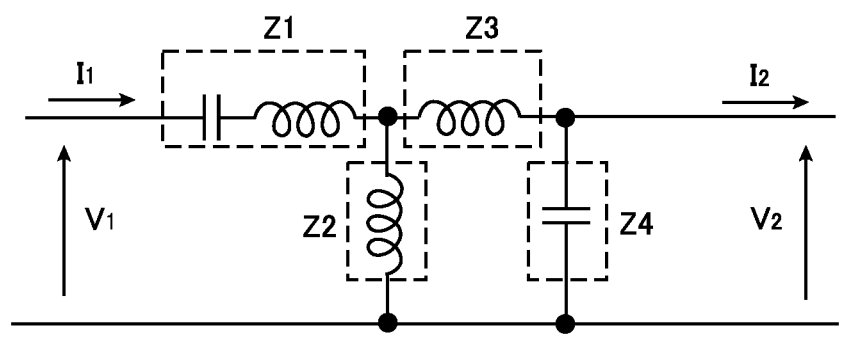
Figure 4C:
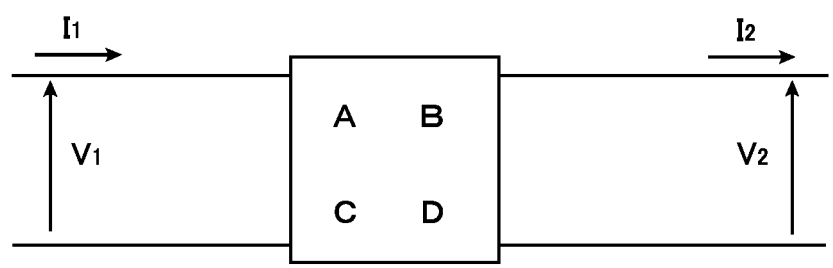

FIG. 4C is a diagram showing an equivalent circuit that represents the circuit shown in FIG. 4B using an F parameter. Note that the elements A, B, C, and D of the F parameter are all vectors, and the F parameter is as expressed by equation (6) below.

$$\begin{pmatrix} A & B \\ C & D \end{pmatrix} = \begin{pmatrix} 1 & Z1 \\ 0 & 1 \end{pmatrix}\begin{pmatrix} 1 & 0 \\ \frac{1}{Z2} & 1 \end{pmatrix}\begin{pmatrix} 1 & Z3 \\ 0 & 1 \end{pmatrix}\begin{pmatrix} 1 & 0 \\ \frac{1}{Z4} & 1 \end{pmatrix} \quad (6)$$

$$= \begin{pmatrix} \frac{Z1Z2 + Z2Z3 + Z3Z1 + Z4Z1}{Z2Z4} & \frac{Z1 + Z2}{Z2} \\ \frac{Z2 + Z3 + Z4}{Z2Z4} & \frac{Z2 + Z3}{Z2} \end{pmatrix}$$

When Z1+Z2=Z2+Z3+Z4=0, which is a conditional equation for magnetic field resonance, is substituted into equation (6) above, equation (7) below is obtained. Accordingly, equation (9) below is obtained based on equation (8) below and equations (3) and (4) above.

$$\begin{pmatrix} A & B \\ C & D \end{pmatrix} = \begin{pmatrix} \frac{Z1Z2 + Z2Z3 + Z3Z1 + Z4Z1}{Z2Z4} & 0 \\ 0 & \frac{Z2 + Z3}{Z2} \end{pmatrix} \quad (7)$$

$$\begin{pmatrix} V_1 \\ I_1 \end{pmatrix} = \quad (8)$$

$$\begin{pmatrix} A & B \\ C & D \end{pmatrix}\begin{pmatrix} V_2 \\ I_2 \end{pmatrix} = \begin{pmatrix} \frac{Z1Z2 + Z2Z3 + Z3Z1 + Z4Z1}{Z2Z4} & 0 \\ 0 & \frac{Z2 + Z3}{Z2} \end{pmatrix}\begin{pmatrix} V_2 \\ I_2 \end{pmatrix}$$

$$I_1 = \quad (9)$$

$$\frac{Z2 + Z3}{Z2} \times I_2 \therefore I_2 = \frac{Z2}{Z2 + Z3} \times I_1 = \frac{j\omega k\sqrt{L_t \cdot L_r}}{j\omega \cdot L_r} \times I_1 = \sqrt{\frac{L_t}{L_r}} \times I_1$$

If the distance between the transmission coil Lt1 and the reception coil Lr1 does not change, the coupling coefficient k does not change. Accordingly, according to equation (9) above, the size of the current $I_2$ output from the power reception unit 31 is proportional to the size of the current $I_1$ input to the power transmission unit 21. Also, because the power transmission units 21 to 23 are connected in series, the current $I_1$ input to the transmission unit 21 is the output current of the high-frequency power source device 1. If the DC voltage output by the DC power source device 11 is constant, the size of the output current of the high-frequency power source device 1 is constant, and the current $I_1$ is also constant. Accordingly, if the DC voltage output by the DC power source device 11 is constant, the size of the output current $I_2$ of the power reception unit 31 is constant, regardless of the impedance or the like of the load that is connected. In other words, the output of the power reception unit 31 can be thought of as a constant current source that outputs the current $I_2$ with a constant size. Because the size of the output current $I_2$ of the power reception unit 31 is constant, the current rectified and smoothed by the rectifying/smoothing circuit 41 is constant. Accordingly, the current output by the rectifying/smoothing circuit 41 is constant regardless of the charge state of the battery D.

Similarly, if the DC voltage output by the DC power source device 11 is constant, the size of the output current of the power reception unit 32 (33) is also constant regardless of the impedance or the like of the load that is connected, and the output of the power reception unit 32 (33) can also be thought of as a constant current source that outputs a current with a constant size. Because the size of the output current of the power reception unit 32 (33) is constant, the current rectified and smoothed by the rectifying/smoothing circuit 42 (43) is constant. Accordingly, the current output by the rectifying/smoothing circuit 42 (43) is constant regardless of the charge state of the battery D.

If the constant current sources are connected in parallel, the output currents are added together and output. Accordingly, the current to be supplied to the battery D is obtained by adding together the currents output by the rectifying/smoothing circuits 41 to 43. The currents output by the rectifying/smoothing circuits 41 to 43 are constant, and therefore the current that is obtained by adding those currents together and is supplied to the battery D is also constant. In other words, the output of the contactless power transmission system C can be thought of as a constant current source that outputs a current with a constant size.

Next, effects of the contactless power transmission system C according to the first embodiment will be described.

According to the present embodiment, the power transmission units 21 to 23 are serial resonance circuits, and the power reception units 31 to 33 are parallel resonance circuits. Also, the high-frequency power source device 1 outputs a high-frequency current with a constant size to the power transmission units 21 to 23, and power transmission is performed from the power transmission units 21 to 23 to the power reception units 31 to 33 by magnetic field resonance. Accordingly, the outputs of the reception units 31 to 33 are equivalent to the outputs of constant current sources, and the outputs of the rectifying/smoothing circuits 41 to 43 are also equivalent to the outputs of constant current sources. Thus, the currents output by the rectifying/smoothing circuits 41 to 43 are added together and supplied to the load (battery D). Accordingly, even if the specifications of the power transmission units 21, 22, and 23 and the power reception units 31, 32, and 33 are different or the coupling coefficients are different, power can be suitably supplied from the power reception units 31, 32, and 33 to the load. For example, the battery D can be charged even in a state in which the parking position of the electric automobile is misaligned and the coupling coefficients are different.

Also, according to the present embodiment, the high-frequency power source device 1 can output a high-frequency current of a constant size to the power transmission units 21 to 23 by inputting the high-frequency control signal S2 to one switching element Qs. Because it is not necessary to provide dead time in the high-frequency control signal S2, the drive circuit for outputting the high-frequency control signal S2 to the switching element can be given a simple configuration.

Also, according to the present embodiment, a resonance circuit LC2 composed of the inductor L2 and the capacitor C2 is connected in parallel to the switching element Qs of the high-frequency power source device 1. The resonance circuit LC2 has a low impedance with respect to a frequency component (second harmonic component) that is two times the switching frequency $f_0$, and has a high impedance with respect to a component of the switching frequency $f_0$ (fundamental component) and a frequency component (third harmonic component) that is three times the switching frequency $f_0$. Accordingly, the second harmonic component of the high-frequency current generated by the high-frequency power source device 1 flows in the resonance circuit LC2, and the voltage generated by the second harmonic component current between the drain and source of the switching element Qs can be suppressed. Thus, the switching element Qs does not need to have a high breakdown voltage.

Figure 5:
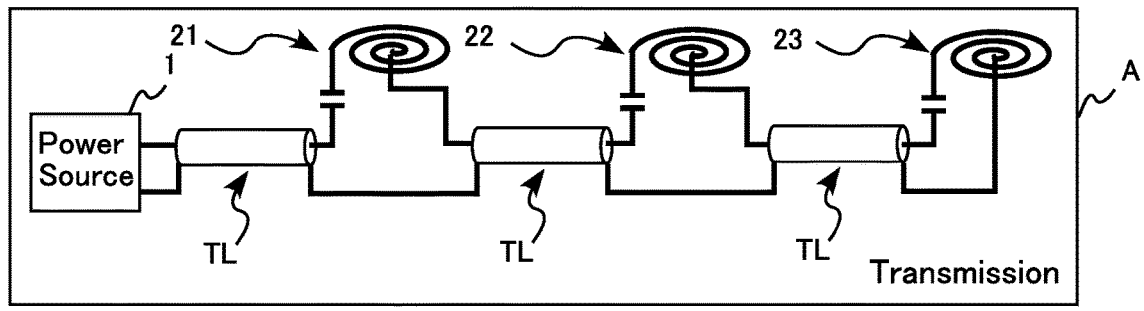
FIG. 5 is a drawing showing a modified example of the contactless power transmission system according to the first embodiment.

Note that if the switching frequency $f_0$ is high (e.g., 10 [MHz] or more) and the gaps between the power transmission units 21 to 23 are wide, or if they are located away from the high-frequency power source device 1, the influence of the lengths of the connecting wires connecting the high-frequency power source device 1 and the power transmission units 21 to 23 can no longer be ignored. That is, if the connecting wires are long, the size of the current is different at each position of the connecting wires due to the influence of standing waves in the current. For this reason, it is preferable that in the connection between the high-frequency power source device 1 and the power transmission units 21 to 23, a transmission line is used that is approximately half of the length of the transmission wavelength of the high frequency wave output by the high-frequency power source device 1, so that the current values of the power transmission units are the same. In FIG. 5, the connecting wires connecting the high-frequency power source device 1 and the power transmission units 21 to 23 are formed by transmission lines TL. FIG. 5 shows only the power transmission apparatus A. Other than the fact that the transmission lines TL are used, the power transmission apparatus A is the same as that in the contactless power transmission system C shown in FIG. 1.

As shown in FIG. 5, the transmission lines TL are connected in series between the high-frequency power source device 1 and the power transmission unit 21, between the power transmission unit 21 and the power transmission unit 22, and between the power transmission unit 22 and the power transmission unit 23. In the present embodiment, coaxial cables are used as the transmission lines TL. Note that the transmission lines TL are not limited to being coaxial cables, and for example, coaxial tubes or the like may be used.

The lengths of the transmission lines TL are about half of the transmission wavelengths in the transmission lines TL of the fundamental wave of the high-frequency wave output by the high-frequency power source device 1. Letting f be the frequency, and letting v be the velocity of an electromagnetic wave in the transmission line TL, the transmission wavelength $\lambda$ of the high-frequency wave output by the high-frequency power source device 1 is expressed by $\lambda$ [m]=v [m/s]/f [Hz]. Because the velocity v of the electromagnetic wave in the coaxial cable (made of polyethylene) is about 66% of the velocity of an electromagnetic wave in a vacuum ($3.0 \times 10^8$ [m/s]), when the switching frequency $f_0$=13.56 [MHz] is used, for example, the transmission wavelength $\lambda$ of the high-frequency wave output by the high-frequency power source device 1 is such that $\lambda=(3.0 \times 10^8) \times (66/100)/(13.56 \times 10^6) \approx 14.60$ [m]. The length of the transmission lines TL is about half of the transmission wavelength $\lambda$, and therefore $14.60 \times (\frac{1}{2})=7.30$ [m] is satisfied. Note that although it was assumed that the velocity v of the electromagnetic wave in the coaxial cable is about 66% of the velocity of an electromagnetic wave in a vacuum, the velocity of the electromagnetic wave in the coaxial cable varies depending on the wavelength shortening coefficient of the coaxial cable that is used (specifically, the insulating material of the coaxial cable). Accordingly, the length of the transmission line TL need only be changed as appropriate according to the type of the coaxial cable that is used.

Note that the length of the transmission line TL is not limited to being about half of the transmission wavelength in the transmission line TL of the fundamental wave of the high-frequency wave output by the high-frequency power source device 1, and may be an integer multiple thereof. That is, the length of the transmission line TL may be the same as the transmission wavelength, three-halves of the transmission wavelength, two times the transmission wavelength, . . . or the like. By connecting the high-frequency power source device 1 and the power transmission units 21 to 23 using the transmission lines TL, the influence of standing waves in the currents can be removed, whereby the current values of the power transmission units can be made the same.

In the above-described first embodiment, a case was described in which the power reception units 31 to 33 are parallel resonance circuits, but there is no limitation thereto. A case in which the power reception units 31 to 33 are serial resonance circuits will be described hereinafter.

Figure 6:
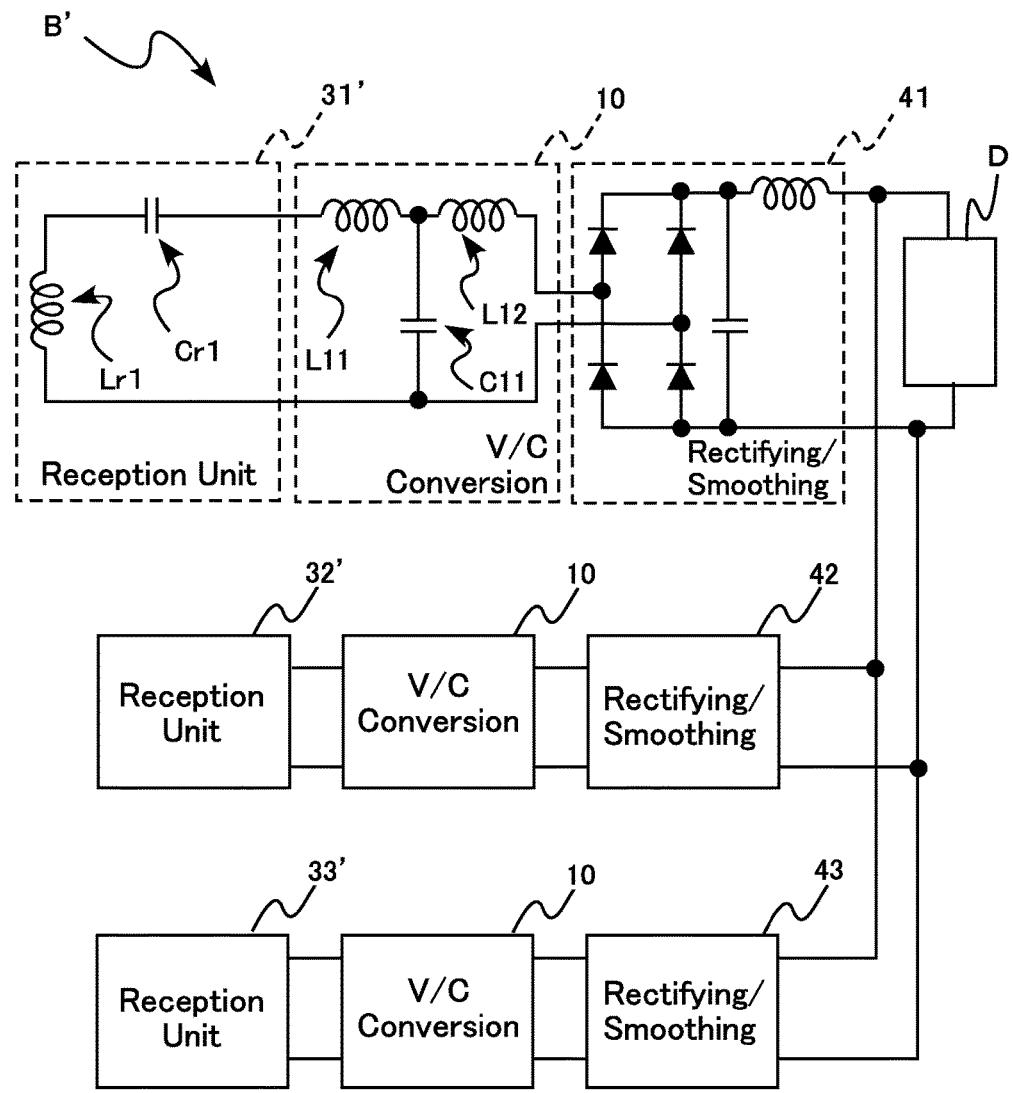
FIG. 6 is a circuit diagram showing a configuration of a contactless power transmission system according to a second embodiment.

FIG. 6 is a circuit diagram showing a configuration of a contactless power transmission system C' according to a second embodiment. Because the power transmission apparatus A is the same as the power transmission apparatus A according to the first embodiment, FIG. 6 shows only the power reception apparatus B'. Also, the illustrations of power reception units 32' and 33', voltage-current conversion circuits 10 connected thereto, and rectifying/smoothing circuits 42 and 43 have been simplified. In FIG. 6, elements that are the same as or similar to those of the contactless power transmission system C (see FIG. 2) according to the first embodiment are denoted by the same reference signs. The contactless power transmission system C' differs from the contactless power transmission system C according to the first embodiment in that the power reception unit 31' (32', 33') is a serial resonance circuit, and in that the voltage-current conversion circuit 10 is provided between the power reception unit 31' (32', 33') and the rectifying/smoothing circuit 41 (42, 43).

The power reception unit 31' constitutes a serial resonance circuit due to a resonance capacitor Cr1 being connected in series to a power reception coil Lr1. Similarly to the power transmission coil Lt1 and the resonance capacitor Ct1, the power reception coil Lr1 and the resonance capacitor Cr1 are designed such that the resonant frequency matches the switching frequency $f_0$. Note that if the switching frequency $f_0$ is high, the floating capacitance between the windings of the power reception coil Lr1 may be used as the resonance capacitor Cr1. The configurations of the power reception unit 32' and the power reception unit 33' are similar to that of the power reception unit 31'.

The voltage-current conversion circuit 10 converts a voltage output into a current output. The voltage-current conversion circuit 10 is a circuit obtained by arranging two inductors L11 and L12 and a capacitor C11 in a T shape. The inductor L11 and the inductor L12 are connected in series to each other, and are connected in series between the power reception unit 31' (32', 33') and the rectifying/smoothing circuit 41 (42, 43). Also, the capacitor C11 is connected in parallel to the connection point between the inductor L11 and the inductor L12. The inductances and the capacitance are determined such that the sizes of the impedances of the inductors L11 and L12 and the capacitor C11 at the switching frequency $f_0$ become equal.

Figure 7A:
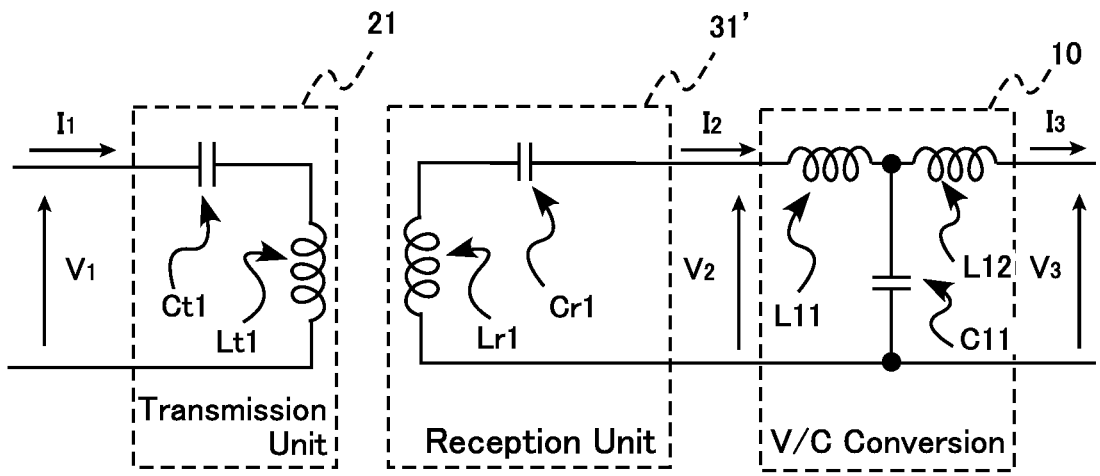
FIGS. 7A to 7C are diagrams illustrating circuits of a portion of the contactless power transmission system shown in FIG. 6 using an equivalent circuit.

In FIG. 7A, only the power transmission unit 21, the power reception unit 31', and the voltage-current conversion circuit 10 in the contactless power transmission system C' shown in FIG. 6 are shown.

Let $V_1$ be the voltage applied to the power transmission unit 21, $I_1$ be the current that is input, $V_2$ be output voltage of the power reception unit 31', $I_2$ be the output current, $V_3$ be the output voltage of the voltage-current conversion circuit 10, and $I_3$ be the output current. In other words, let the voltage applied to the rectifying/smoothing circuit 41 be $V_3$, and let the current input to the rectifying/smoothing circuit 41 be $I_3$. Note that the voltages $V_1$, $V_2$, and $V_3$ and the currents $I_1$, $I_2$, and $I_3$ are all vectors.

Figure 7B:
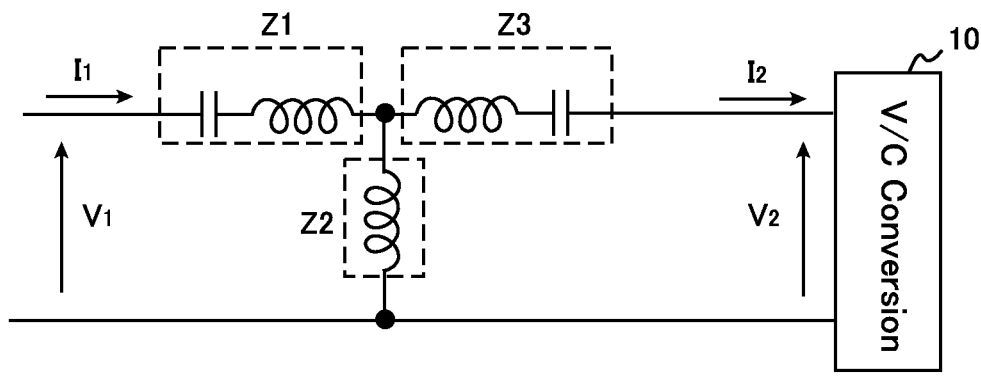

The circuit shown in FIG. 7B is the circuit shown in FIG. 7A upon being converted into an equivalent circuit represented by using a T circuit. In FIG. 7B, as shown in the drawing, the impedances of the capacitors or coils are expressed as Z1 to Z3. Note that the impedances Z1 to Z3 are all vectors and can be expressed using equations (10) to (12) below. Note that the self-inductances of the power transmission coil Lt1 and the power reception coil Lr1 are denoted as $L_t$ and $L_r$ respectively, and the capacitances of the resonance capacitor Ct1 and the resonance capacitor Cr1 are denoted as $C_t$ and $C_r$ respectively. Also, the coupling coefficient for the power transmission coil Lt and the power reception coil Lr is denoted as k.

$$Z1 = \frac{1}{j\omega \cdot C_t} + j\omega(L_t - k\sqrt{L_t \cdot L_r}) \quad (10)$$

$$Z2 = j\omega k\sqrt{L_t \cdot L_r} \quad (11)$$

$$Z3 = \frac{1}{j\omega \cdot C_r} + j\omega(L_r - k\sqrt{L_t \cdot L_r}) \quad (12)$$

In the case of using an F parameter to express the circuit shown in FIG. 7B, the F parameter is as indicated in equation (13) below. Note that the elements A, B, C, and D of the F parameter are all vectors.

$$\begin{pmatrix} A & B \\ C & D \end{pmatrix} = \begin{pmatrix} 1 & Z1 \\ 0 & 1 \end{pmatrix}\begin{pmatrix} 1 & 0 \\ \frac{1}{Z2} & 1 \end{pmatrix}\begin{pmatrix} 1 & Z3 \\ 0 & 1 \end{pmatrix} \quad (13)$$

$$= \begin{pmatrix} \frac{Z1+Z2}{Z2} & \frac{(Z1+Z2)(Z2+Z3)-Z2^2}{Z2} \\ \frac{1}{Z2} & \frac{Z2+Z3}{Z2} \end{pmatrix}$$

When Z1+Z2=Z2+Z3=0, which is a conditional equation for magnetic field resonance, is substituted into equation (13) above, equation (14) below is obtained. Accordingly, equation (16) below is obtained based on equation (15) below and equation (11) above.

$$\begin{pmatrix} A & B \\ C & D \end{pmatrix} = \begin{pmatrix} 0 & -Z2 \\ \frac{1}{Z2} & 0 \end{pmatrix} \quad (14)$$

$$\begin{pmatrix} V_1 \\ I_1 \end{pmatrix} = \begin{pmatrix} A & B \\ C & D \end{pmatrix}\begin{pmatrix} V_2 \\ I_2 \end{pmatrix} = \begin{pmatrix} 0 & -Z2 \\ \frac{1}{Z2} & 0 \end{pmatrix}\begin{pmatrix} V_2 \\ I_2 \end{pmatrix} \quad (15)$$

$$I_1 = \frac{1}{Z2} \times V_2 \therefore V_2 = Z2 \times I_1 = j\omega k\sqrt{L_t \cdot L_r} \times I_1 \quad (16)$$

If the distance between the transmission coil Lt1 and the reception coil Lr1 does not change, the coupling coefficient k does not change. Accordingly, according to equation (16) above, the size of the voltage $V_2$ output from the power reception unit 31' is proportional to the size of the current $I_1$ input to the power transmission unit 21. Also, because the power transmission units 21 to 23 are connected in series, the current $I_1$ input to the transmission unit 21 is the output current of the high-frequency power source device 1. If the DC voltage output by the DC power source device 11 is constant, the size of the output current of the high-frequency power source device 1 is constant, and the current $I_1$ is also constant. Accordingly, if the DC voltage output by the DC power source device 11 is constant, the size of the output voltage $V_2$ of the power reception unit 31' is constant, regardless of the impedance or the like of the load that is connected. In other words, the output of the power reception unit 31' can be thought of as a constant voltage source that outputs the voltage $V_2$ with a constant size.

Figure 7C:
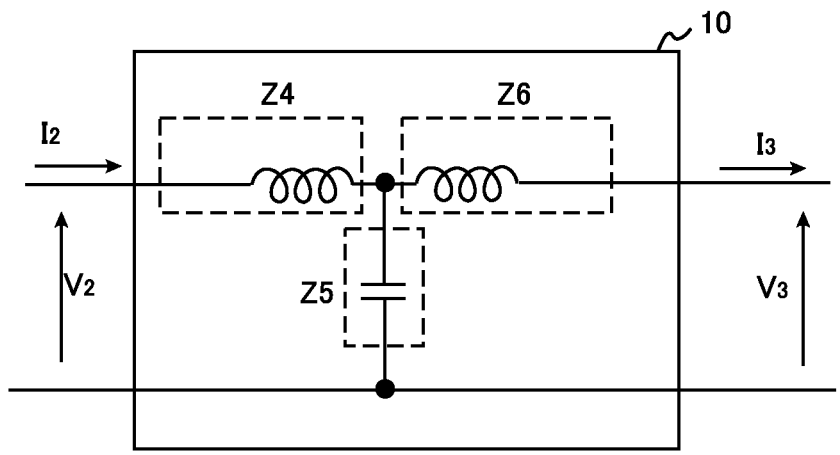

FIG. 7C shows a circuit of the voltage-current conversion circuit 10. In FIG. 7C, as shown in the drawing, the impedances of the capacitors or coils are expressed as Z4 to Z6. Note that the impedances Z4 to Z6 are all vectors and can be expressed using equations (17) to (19) below. Note that the self-inductances of the inductor L11 and the inductor L12 are denoted as $L_{11}$ and $L_{12}$, and the capacitance of the capacitor C11 is denoted as $C_{11}$.

$$Z4 = j\omega \cdot L_{11} \quad (17)$$

$$Z5 = \frac{1}{j\omega \cdot C_{11}} \quad (18)$$

$$Z6 = j\omega \cdot L_{12} \quad (19)$$

In the case of using an F parameter to express the circuit shown in FIG. 7C, the F parameter is as indicated in equation (20) below. Note that the elements A, B, C, and D of the F parameter are all vectors.

$$\begin{pmatrix} A & B \\ C & D \end{pmatrix} = \begin{pmatrix} 1 & Z4 \\ 0 & 1 \end{pmatrix} \begin{pmatrix} 1 & 0 \\ \frac{1}{Z5} & 1 \end{pmatrix} \begin{pmatrix} 1 & Z6 \\ 0 & 1 \end{pmatrix} \quad (20)$$

$$= \begin{pmatrix} \frac{Z4 + Z5}{Z5} & \frac{(Z4 + Z5)(Z5 + Z6) - Z5^2}{Z5} \\ \frac{1}{Z5} & \frac{Z5 + Z6}{Z5} \end{pmatrix}$$

Because the inductances and the capacitance are determined such that the sizes of the impedances of the inductors L11 and L12 and the capacitor C11 at the frequency $f_0$ (switching frequency $f_0$) of the high-frequency power supplied by the high-frequency power supply apparatus 1 are equal, Z4+Z5=Z5+Z6=0 is satisfied. When this is substituted into equation (20) above, equation (21) below is obtained. Accordingly, equation (23) below is obtained based on equation (22) below and equation (18) above.

$$\begin{pmatrix} A & B \\ C & D \end{pmatrix} = \begin{pmatrix} 0 & -Z5 \\ \frac{1}{Z5} & 0 \end{pmatrix} \quad (21)$$

$$\begin{pmatrix} V_2 \\ I_2 \end{pmatrix} = \begin{pmatrix} A & B \\ C & D \end{pmatrix} \begin{pmatrix} V_3 \\ I_3 \end{pmatrix} = \begin{pmatrix} 0 & -Z5 \\ \frac{1}{Z5} & 0 \end{pmatrix} \begin{pmatrix} V_3 \\ I_3 \end{pmatrix} \quad (22)$$

$$V_2 = -Z5 \times I_3 \therefore I_3 = -\frac{1}{Z5} \times V_2 = -j\omega \cdot C_{11} \times V_2 \quad (23)$$

Because the capacitance $C_{11}$ is a fixed value, according to equation (23) above, the size of the output current $I_3$ of the voltage-current conversion circuit 10 is proportional to the size of the voltage $V_2$ that is output from the power reception unit 31' and input to the voltage-current conversion circuit 10. Also, if the DC voltage output by the DC power source device 11 is constant, the size of the output voltage $V_2$ of the power reception unit 31' is constant. Accordingly, if the DC voltage output by the DC power source device 11 is constant, the size of the output current $I_3$ of the voltage-current conversion circuit 10 is constant, regardless of the impedance or the like of the load that is connected. In other words, the output of the voltage-current conversion circuit 10 can be thought of as a constant current source that outputs the current $I_3$ with a constant size. Because the size of the output current $I_3$ of the voltage-current conversion circuit 10 is constant, the current rectified and smoothed by the rectifying/smoothing circuit 41 is constant. Accordingly, the current output by the rectifying/smoothing circuit 41 is constant regardless of the charge state of the battery D.

Similarly, if the DC voltage output by the DC power source device 11 is constant, the size of the output voltage of the power reception unit 32' (33') is also constant regardless of the impedance or the like of the load that is connected, and the output of the power reception unit 32' (33') can also be thought of as a constant voltage source that outputs a voltage with a constant size. Accordingly, the size of the output current of the voltage-current conversion circuit 10 connected downstream of the power reception unit 32' (33') is also constant regardless of the impedance or the like of the load that is connected. In other words, the outputs of the voltage-current conversion circuits 10 can be thought of as constant current sources that output currents with a constant size. Because the sizes of the output currents of the voltage-current conversion circuits 10 are constant, the current rectified and smoothed by the rectifying/smoothing circuit 42 (43) is constant. Accordingly, the current output by the rectifying/smoothing circuit 42 (43) is constant regardless of the charge state of the battery D.

If the constant current sources are connected in parallel, the output currents are added together and output. Accordingly, the current to be supplied to the battery D is obtained by adding together the currents output by the rectifying/smoothing circuits 41 to 43. The currents output by the rectifying/smoothing circuits 41 to 43 are constant, and therefore the current that is obtained by adding those currents together and is supplied to the battery D is also constant. In other words, the output of the contactless power transmission system C' can be thought of as a constant current source that outputs a current with a constant size.

In the second embodiment, the power transmission units 21 to 23 are serial resonance circuits, and the power reception units 31' to 33' are serial resonance circuits. Also, the high-frequency power source device 1 outputs the high-frequency current with a constant size to the power transmission units 21 to 23 and power transmission is performed from the power transmission units 21 to 23 to the power reception units 31' to 33' by magnetic field resonance. Accordingly, the outputs of the power reception units 31' to 33' are equivalent to the outputs of constant voltage sources. Also, the voltage-current conversion circuit 10 is connected downstream of the power reception units 31' to 33'. Accordingly, the outputs of the voltage-current conversion circuits 10 are equivalent to the outputs of constant current sources. Thus, the outputs of the rectifying/smoothing circuits 41 to 43 are also equivalent to the outputs of constant current sources, and the currents output by the rectifying/smoothing circuits 41 to 43 are added together and supplied to the load (battery D). Accordingly, even if the specifications of the power transmission units 21, 22, and 23 and the power reception units 31', 32', and 33' are different or the coupling coefficients are different, power can be suitably supplied to the load from the power reception units 31', 32', and 33'.

In the second embodiment as well, the high-frequency power source device 1 can output the high-frequency current with the constant size to the power transmission units 21 to 23 by inputting the high-frequency control signal S2 to one switching element Qs. Because it is not necessary to provide dead time in the high-frequency control signal S2, the drive circuit for outputting the high-frequency control signal S2 to the switching element can be given a simple configuration.

Also, in the second embodiment as well, the resonance circuit LC2 composed of the inductor L2 and the capacitor C2 is connected in parallel to the switching element Qs of the high-frequency power source device 1. Accordingly, the second harmonic component of the high-frequency current generated by the high-frequency power source device 1 flows in the resonance circuit LC2, and the voltage generated by the second harmonic component current between the drain and source of the switching element Qs can be suppressed.

Note that in the second embodiment, a case was described in which the voltage-current conversion circuit 10 was a circuit in which two inductors L11 and L12 and a capacitor C11 are arranged in a T shape, but the circuit configuration of the voltage-current conversion circuit 10 is not limited to the description above. For example, a circuit in which one inductor and two capacitors are arranged in a T shape may be used, a circuit in which two inductors and one capacitor are arranged in a π shape may be used, or a circuit in which one inductor and two capacitors are arranged in a π shape may be used.

Also, the voltage-current conversion circuit 10 is not limited to being a circuit in which an inductor and a capacitor are combined. It is sufficient that the voltage-current conversion circuit 10 converts the voltage output from the power reception unit 31' (32', 33') into the current output.

Figure 8:
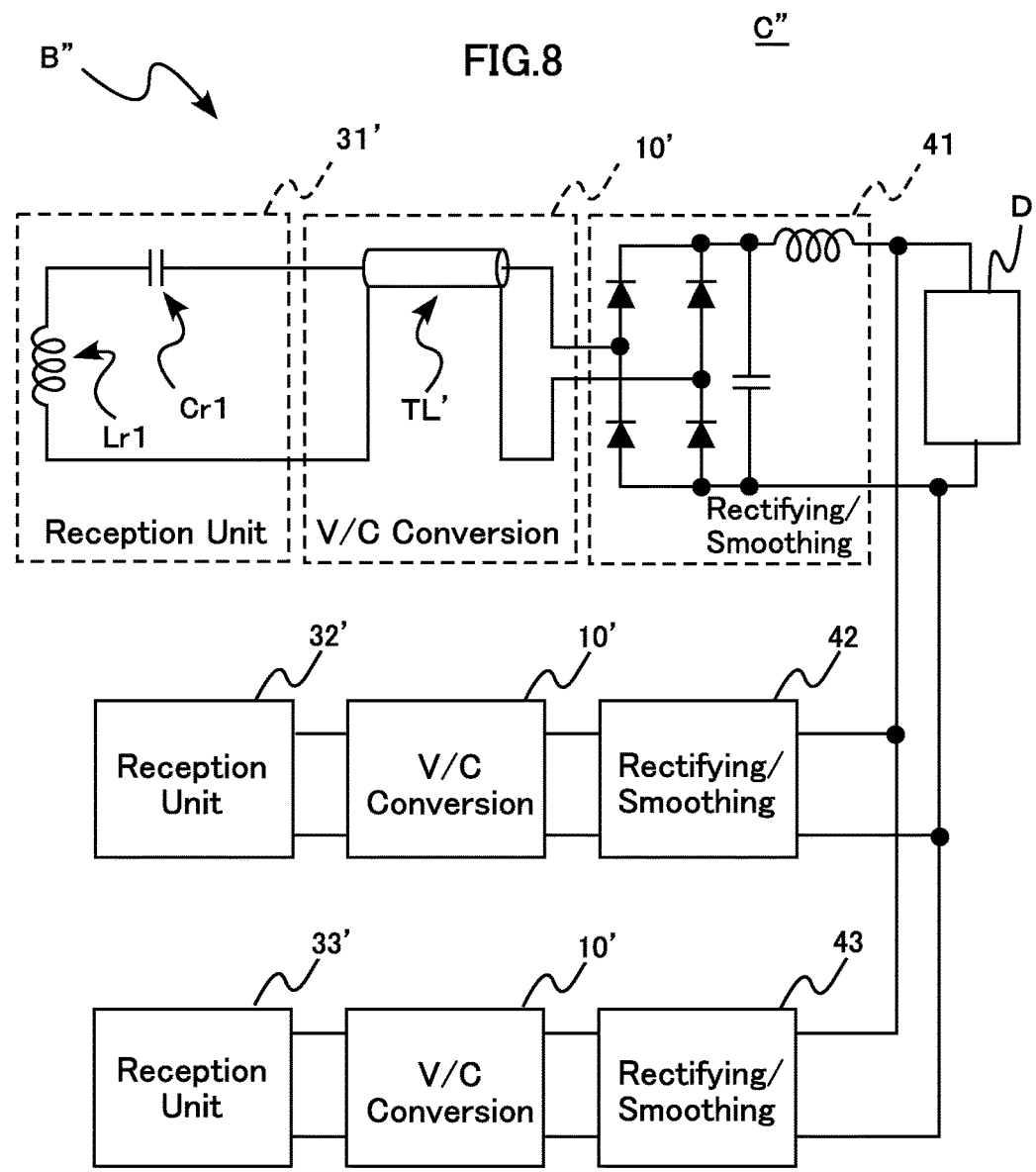
FIG. 8 is a circuit diagram showing a configuration of a contactless power transmission system according to a third embodiment.

FIG. 8 is a circuit diagram showing a configuration of a contactless power transmission system C″ according to a third embodiment. Because the power transmission apparatus A is the same as the power transmission apparatus A according to the first embodiment, FIG. 8 shows only the power reception apparatus B″. Also, the illustrations of power reception units 32' and 33', voltage-current conversion circuits 10' connected thereto, and rectifying/smoothing circuits 42 and 43 have been simplified. In FIG. 8, elements are the same as or similar to those of the contactless power transmission system C' (see FIG. 6) according to the second embodiment are denoted by the same reference signs. The configuration of the voltage-current conversion circuits 10' of the contactless power transmission system C″ differs from that of the voltage-current conversion circuits 10 of the contactless power transmission system C' according to the second embodiment.

The voltage-current conversion circuits 10' convert voltage outputs into current outputs. The voltage-current conversion circuits 10' include a transmission line TL'. The transmission line TL' is connected in series between the power reception unit 31' (32', 33') and the rectifying/smoothing circuit 41 (42, 43). In the present embodiment, a coaxial cable is used as the transmission line TL'. Note that the transmission line TL' is not limited to being a coaxial cable, and for example, may be a coaxial tube, a line formed on a substrate, or the like.

The length of the transmission line TL' is about one-fourth of the transmission wavelength in the transmission line TL' of the fundamental wave of the high frequency wave (i.e., the high frequency wave output by the high-frequency power source device 1) input by the power reception unit 31' (32', 33'). As described above, if the switching frequency $f_0$=13.56 [MHz], the transmission wavelength $\lambda$ in the coaxial cable (made of polyethylene) of the fundamental wave of the high frequency wave output by the high-frequency power source device 1 is about 14.60 [m]. The length of the transmission line TL' is approximately one-fourth of the transmission wavelength $\lambda$, and therefore is 14.60×(¼)≈3.65 [m]. Note that the lower the frequency of the fundamental wave output by the high-frequency power source device 1 is, the longer the transmission wavelength $\lambda$ is. Accordingly, if the frequency is low, a longer transmission line TL' needs to be used, and in order to accommodate the transmission line TL' in the housing of the power reception apparatus B″, the size of the power reception apparatus B″ needs to be made larger. Accordingly, it is desirable that the frequency of the high-frequency wave output by the high-frequency power source device 1 is 6.78 MHz or more.

Figure 9:
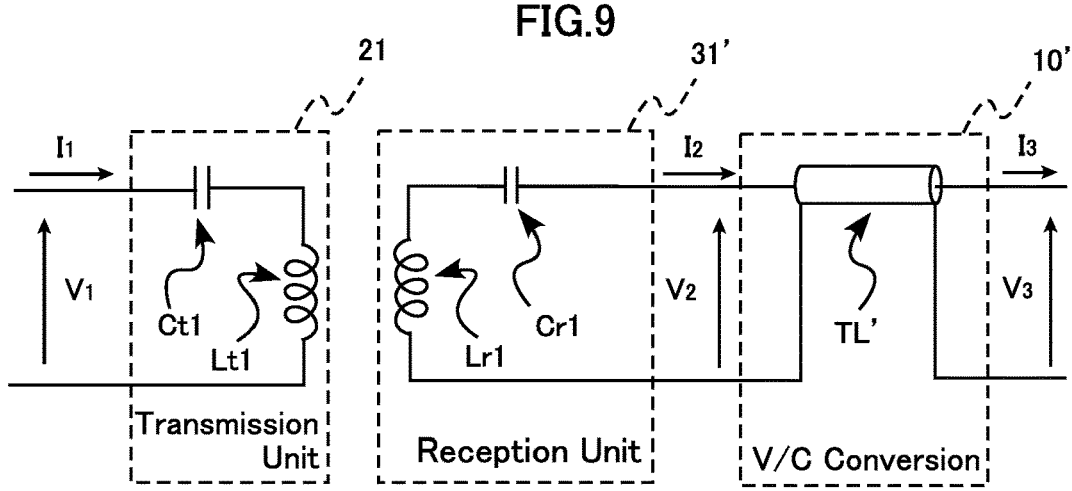
FIG. 9 is a diagram in which the circuits of the portion of the contactless power transmission system shown in FIG. 8 have been omitted.

FIG. 9 shows only the power transmission unit 21, the power reception unit 31', and the voltage-current conversion circuit 10' in the contactless power transmission system C″ shown in FIG. 8.

Let $V_1$ be the voltage applied to the power transmission unit 21, $I_1$ be the current that is input, $V_2$ be the voltage output from the power reception unit 31', $I_2$ be the current that is output, $V_3$ be the output voltage of the voltage-current conversion circuit 10', and $I_3$ be the output current. In other words, let the voltage applied to the rectifying/smoothing circuit 41 be $V_3$, and let the current input to the rectifying/smoothing circuit 41 be $I_3$. Note that the voltages $V_1$, $V_2$, and $V_3$ and the currents $I_1$, $I_2$, and $I_3$ are all vectors.

Since the power transmission unit 21 and the power reception unit 31' are the same as in the second embodiment, if the DC voltage output by the DC power source device 11 is constant, the size of the output voltage $V_2$ of the power reception unit 31' is similarly constant, regardless of the impedance or the like of the load that is connected.

In the case of using an F parameter to express the circuit of the voltage-current conversion circuit 10', the F parameter is as indicated in equation (24) below. Note that the elements A, B, C, and D of the F parameter are all vectors. $Z_0$ is the characteristic impedance of the transmission line TL', $\beta$ is the phase constant ($2\pi/\lambda$) ($\lambda$ being the transmission wavelength in the transmission line TL'), and l is the line length. The line length l of the transmission line TL' is one-fourth of the transmission wavelength $\lambda$, and therefore $\beta \cdot l = \pi/2$. Accordingly, the F parameter is as expressed by equation (25) below.

$$\begin{pmatrix} A & B \\ C & D \end{pmatrix} = \begin{pmatrix} \cos(\beta \cdot l) & j \cdot Z_0 \sin(\beta \cdot l) \\ j \cdot \frac{\sin(\beta \cdot l)}{Z_0} & \cos(\beta \cdot l) \end{pmatrix} \quad (24)$$

$$= \begin{pmatrix} 0 & j \cdot Z_0 \\ j \cdot \frac{1}{Z_0} & 0 \end{pmatrix} \quad (25)$$

Accordingly, equation (27) below is obtained based on equation (26) below.

$$\begin{pmatrix} V_2 \\ I_2 \end{pmatrix} = \begin{pmatrix} A & B \\ C & D \end{pmatrix} \begin{pmatrix} V_3 \\ I_3 \end{pmatrix} = \begin{pmatrix} 0 & j \cdot Z_0 \\ j \cdot \frac{1}{Z_0} & 0 \end{pmatrix} \begin{pmatrix} V_3 \\ I_3 \end{pmatrix} \quad (26)$$

$$V_2 = j \cdot Z_0 \times I_3 \therefore I_3 = -\frac{1}{j \cdot Z_0} \times V_2 \quad (27)$$

Because the characteristic impedance $Z_0$ is a fixed value, according to equation (27) above, the size of the output current $I_3$ of the voltage-current conversion circuit 10' is proportional to the size of the output voltage $V_2$ of the power reception unit 31' and input to the voltage-current conversion circuit 10'. Also, if the DC voltage output by the DC power source device 11 is constant, the size of the output voltage $V_2$ of the power reception unit 31' is constant. Accordingly, if the DC voltage output by the DC power source device 11 is constant, the size of the output current $I_3$ of the voltage-current conversion circuit 10' is constant, regardless of the impedance or the like of the load that is connected. In other words, the output of the voltage-current conversion circuit 10' can be thought of as a constant current source that outputs the current $I_3$ with a constant size. Because the size of the output current $I_3$ of the voltage-current conversion circuit 10' is constant, the current rectified and smoothed by the rectifying/smoothing circuit 41 is constant. Accordingly, the current output by the rectifying/smoothing circuit 41 is constant regardless of the charge state of the battery D.

Similarly, if the DC voltage output by the DC power source device 11 is constant, the size of the output current of the voltage-current conversion circuit 10' connected downstream of the power reception unit 32' (33') is also constant, regardless of the impedance or the like of the load that is connected. In other words, the outputs of the voltage-current conversion circuits 10' can be thought of as constant current sources that output currents with constant sizes. Because the sizes of the output currents of the voltage-current conversion circuits 10' are constant, the current rectified and smoothed by the rectifying/smoothing circuit 42 (43) is constant. Accordingly, the current output by the rectifying/smoothing circuit 42 (43) is constant regardless of the charge state of the battery D.

If the constant current sources are connected in parallel, the output currents are added together and output. Accordingly, the current to be supplied to the battery D is obtained by adding together the currents output by the rectifying/smoothing circuits 41 to 43. The currents output by the rectifying/smoothing circuits 41 to 43 are constant, and therefore the current that is obtained by adding those currents together and is supplied to the battery D is also constant. In other words, the output of the contactless power transmission system C" can be thought of as a constant current source that outputs a current with a constant size.

In the third embodiment, the voltage-current conversion circuits 10' can convert fixed voltage outputs into fixed current outputs, similarly to the voltage-current conversion circuits 10 according to the second embodiment. Accordingly, in the third embodiment as well, an effect similar to that of the second embodiment can be achieved.

Figure 10A:
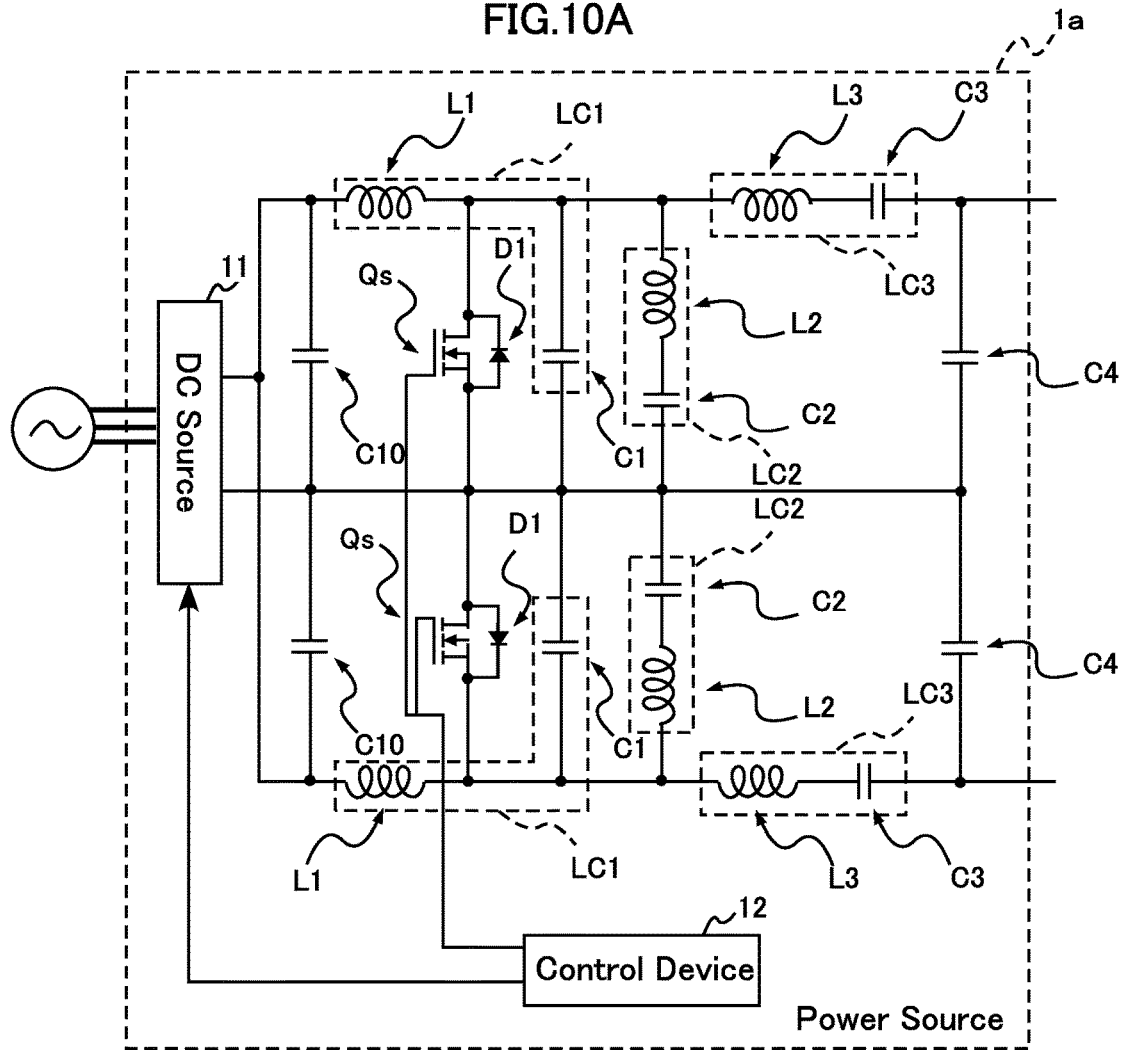
FIGS. 10A and 10B are circuit diagrams showing a modified example of a high-frequency power source device.

In the above-described first to third embodiments, a case was described in which the high-frequency power source device 1 used a so-called one transistor class E amplifier, but there is no limitation to this. For example, an amplifier constituted by a push-pull circuit may be used, as shown in FIG. 10A. A high-frequency power source device 1a uses a so-called push-pull amplifier in which class E amplifiers are connected in positive/negative symmetry such that each amplifies only signals of one polarity. Two resonance circuits LC2 are provided such that there is one for each polarity. In this case as well, the high-frequency power source device 1a can output a high-frequency current with a constant size by inputting the high-frequency control signal S2 to the switching elements Qs. Because it is not necessary to provide dead time in the high-frequency control signal S2, the drive circuit for outputting the high-frequency control signal S2 to the switching elements can be given a simple configuration. Also, resonance circuits LC2 composed of inductors L2 and capacitors C2 are connected in parallel to the respective switching elements Qs. Accordingly, the second harmonic components flow in the resonance circuits LC2, and thus the voltages generated due to the second harmonic component currents between the drains and sources of the switching elements Qs can be suppressed.

Figure 10B:
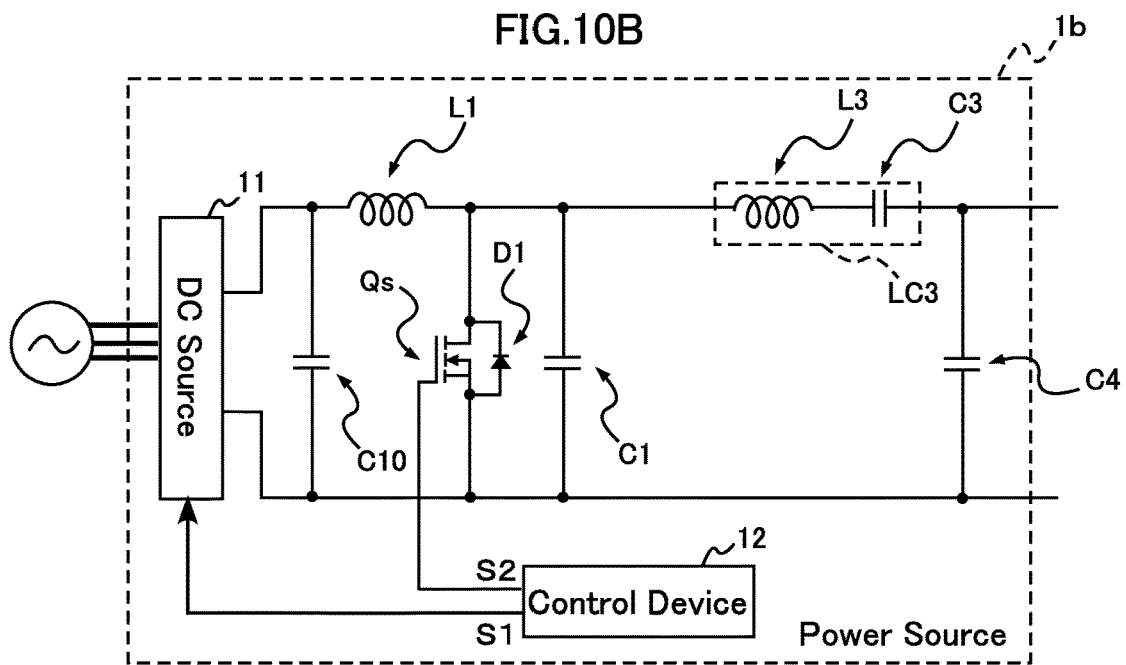

Instead of the high-frequency power source device 1, it is also possible to include a high-frequency power source device 1b that uses a so-called class E amplifier in which the resonance circuit LC2 is not provided (see FIG. 10B). The high-frequency power source device 1b can output a high-frequency current with a constant size by inputting the high-frequency control signal S2 to the switching elements Qs. Because it is not necessary to provide dead time in the high-frequency control signal S2, the drive circuit for outputting the high-frequency control signal S2 to the switching element can be given a simple configuration. Note that in this case, the voltage between the drain and source of the switching element Qs cannot be suppressed, and therefore the switching element Qs needs to have a high breakdown voltage.

Figure 11A:
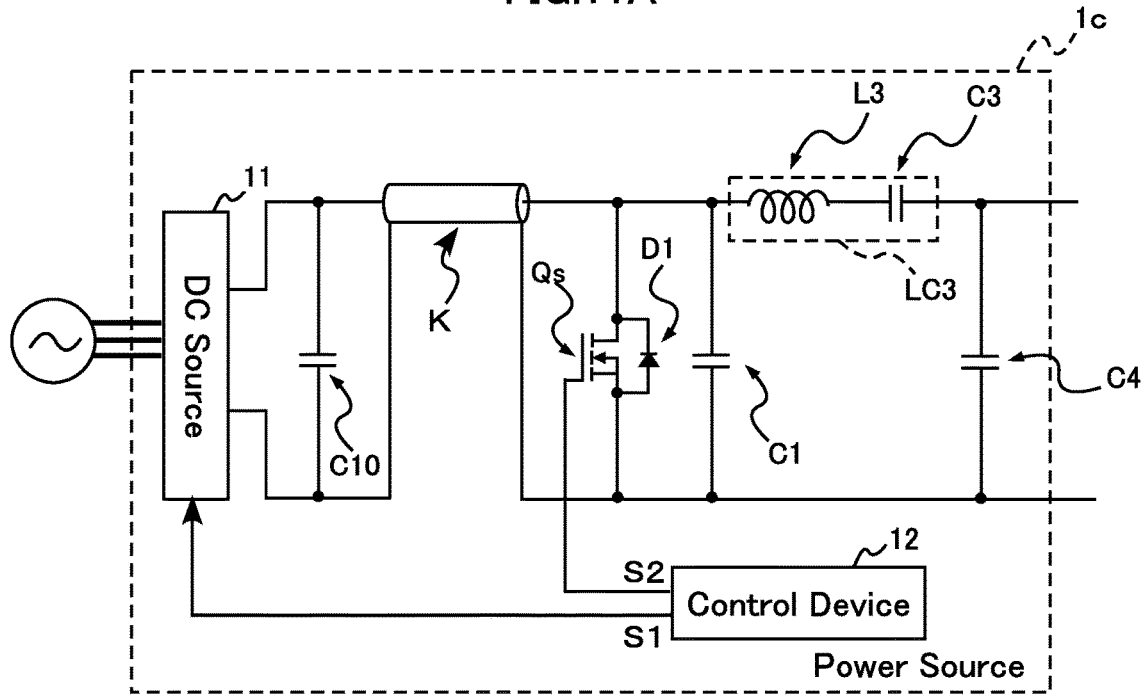
FIGS. 11A and 11B are circuit diagram showing a modified example of a high-frequency power source device.

It is also possible to include a high-frequency power source device 1c obtained by providing the high-frequency power source device 1b (see FIG. 10B) with a transmission line K instead of the inductor L1 (see FIG. 11A). The transmission line K is a line for transmitting power and is connected in series between the output terminal on the high-potential side of the DC power source device 11 and the drain terminal of the switching element Qs. In the present modified example, a coaxial cable is used as the transmission line K. Note that the transmission line K is not limited to being a coaxial cable, and for example, may be a coaxial tube, a line formed on a substrate, or the like.

The length of the transmission line K is approximately one-fourth of the transmission wavelength in the transmission line K of the fundamental wave of the high frequency wave output by the high-frequency power source device 1c. In other words, a transmission line similar to the transmission line TL' described in the third embodiment above is used. Accordingly, if the switching frequency $f_0$=13.56 [MHz], the length of the transmission line K is about 3.65 [m]. Note that the lower the switching frequency $f_0$ is, the longer the transmission line K needs to be. Accordingly, considering the fact that the transmission line K is accommodated in the housing of the high-frequency power source device 1c, it is desirable that the switching frequency $f_0$ is 6.78 MHz or more.

The impedance on the transmission line K side viewed from the drain terminal of the switching element Qs is a low impedance with respect to a frequency component that is equal to an even number times the switching frequency $f_0$, and is a high impedance with respect to the component of the switching frequency $f_0$ (fundamental wave component) and a frequency component that is equal to an odd number times the switching frequency $f_0$. The high-frequency power source device 1c can also output a high-frequency current with a constant size by inputting the high-frequency control signal S2 to the switching elements Qs. Because it is not necessary to provide dead time in the high-frequency control signal S2, the drive circuit for outputting the high-frequency control signal S2 to the switching element can be given a simple configuration. Also, because the transmission line K has a low impedance with respect to the even-numbered harmonic component, the even-numbered harmonic component flows in the transmission line K and can suppress the voltage that occurs due to the even-numbered harmonic component current between the drain and the source of the switching element Qs.

Figure 11B:
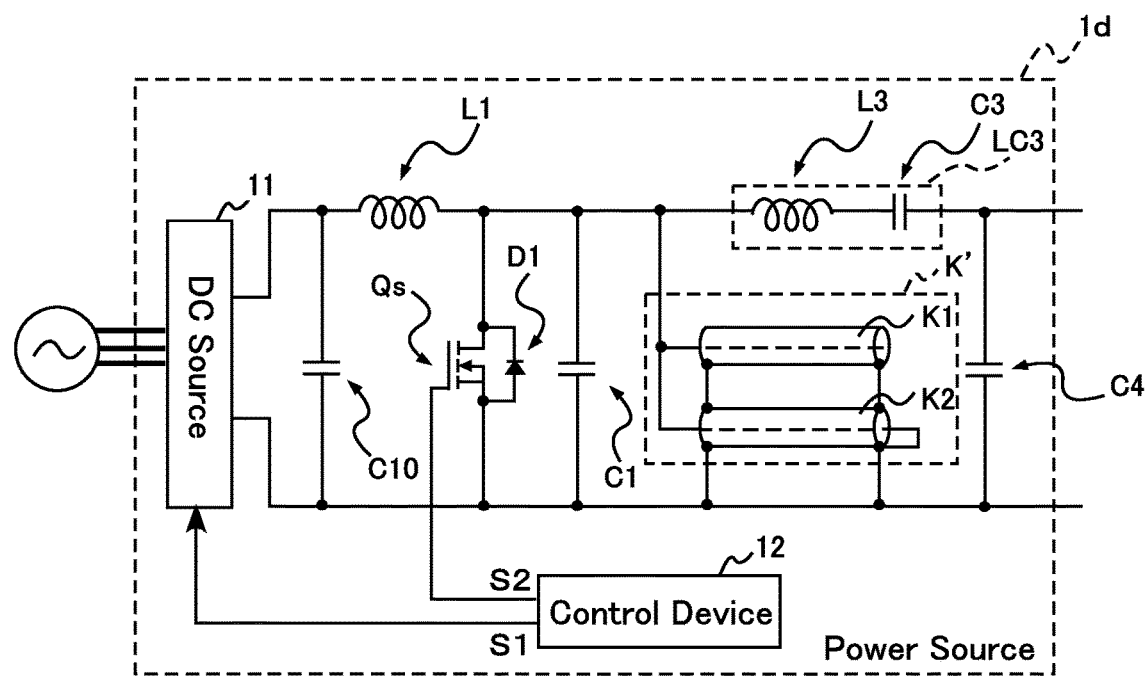

A high-frequency power source device 1d (see FIG. 11B) obtained by providing a transmission line portion K' in the high-frequency power source device 1b (see FIG. 10B) may also be included. The transmission line portion K' attenuates harmonic components of a predetermined order from the high-frequency wave generated by the high-frequency power source device 1d. The transmission line portion K' includes a transmission line K1 and a transmission line K2.

The transmission line K1 is a transmission line with one end connected to the drain terminal of the switching element Qs and the other end open. The transmission line K2 is a transmission line with one end connected to the drain terminal of the switching element Qs and the other end short-circuited. In the present modified example, coaxial cables are used as the transmission lines K1 and K2. Note that the transmission lines K1 and K2 are not limited to being coaxial cables, and for example, coaxial tubes, lines formed on a substrate, or the like may be used.

The length of the transmission lines K1 and K2 is about one-eighth of the transmission wavelength in the transmission lines K1 and K2 of the fundamental wave of the high frequency wave output by the high-frequency power source device 1d. As described above, if the switching frequency $f_0$=13.56 [MHz], the transmission wavelength λ in the coaxial cable (made of polyethylene) of the fundamental wave of the high frequency wave output by the high-frequency power source device 1 is about 14.60 [m]. Because the length of the transmission lines K1 and K2 is about one-eighth of the transmission wavelength λ, the length is 14.60×(⅛)≈1.8 [m]. Note that the lower the switching frequency $f_0$ is, the longer the transmission lines K1 and K2 need to be. Accordingly, considering the fact that the transmission lines K1 and K2 are accommodated in the housing of the high-frequency power source device 1d, it is desirable that the switching frequency $f_0$ is 6.78 MHz or more. Note that the transmission line K1 corresponds to the "first transmission line" of the present invention, and the transmission line K2 corresponds to the "second transmission line" of the present invention.

The impedance of the transmission line portion K' becomes infinitely large at the switching frequency $f_0$ and frequencies that are equal to $f_0$ multiplied by an odd number, and the impedance reaches 0 "Ω" at frequencies that are equal to $f_0$ multiplied by an even number. In other words, in the transmission line portion K', currents at the fundamental wave of the harmonics generated by the high-frequency power source device 1d and odd-numbered harmonics (third harmonic, fifth harmonic, etc.) do not flow, and currents at even-numbered harmonics (second harmonic, fourth harmonic, etc.) flow, and thus the voltage of the harmonic component generated in the switching element Qs is attenuated. The high-frequency power source device 1d can also output a high-frequency current with a constant size by inputting the high-frequency control signal S2 to the switching elements Qs. Because it is not necessary to provide dead time in the high-frequency control signal S2, the drive circuit for outputting the high-frequency control signal S2 to the switching element can be given a simple configuration. Also, the even-numbered harmonic components flow in the transmission line K', and thus the voltage generated due to the second harmonic component current between the drain and source of the switching element Qs can be suppressed.

Note that a high-frequency power source device other than the high-frequency power source devices 1 and 1a to 1d can be used in the present invention, as long as it is a high-frequency power source device that can output a high-frequency current with a constant size.

In the above-described first to third embodiments, a case was described in which three sets each constituted by a power transmission unit and a power reception unit were included, but there is no limitation to this. It is also possible to include two or four or more sets each constituted by a power transmission unit and a power reception unit.

In the first to third embodiments above, the current supplied to the battery D can be changed by changing a target voltage of the DC power source device 11. That is, by changing the target voltage, the output voltage of the DC power source device 11 is changed and the output current of the high-frequency power source device 1 is changed, whereby the output currents of the power reception units 31 to 33 (31' to 33') are changed. Accordingly, the output currents of the rectifying/smoothing circuits 41 to 43 are changed, and the current supplied to the battery D is changed. Note that the current supplied to the battery D may also be changed using another method. Hereinafter, a case will be described in which the power supplied to the battery D is changed by providing the power transmission apparatus A with a switch and switching the switch.

Figure 12:
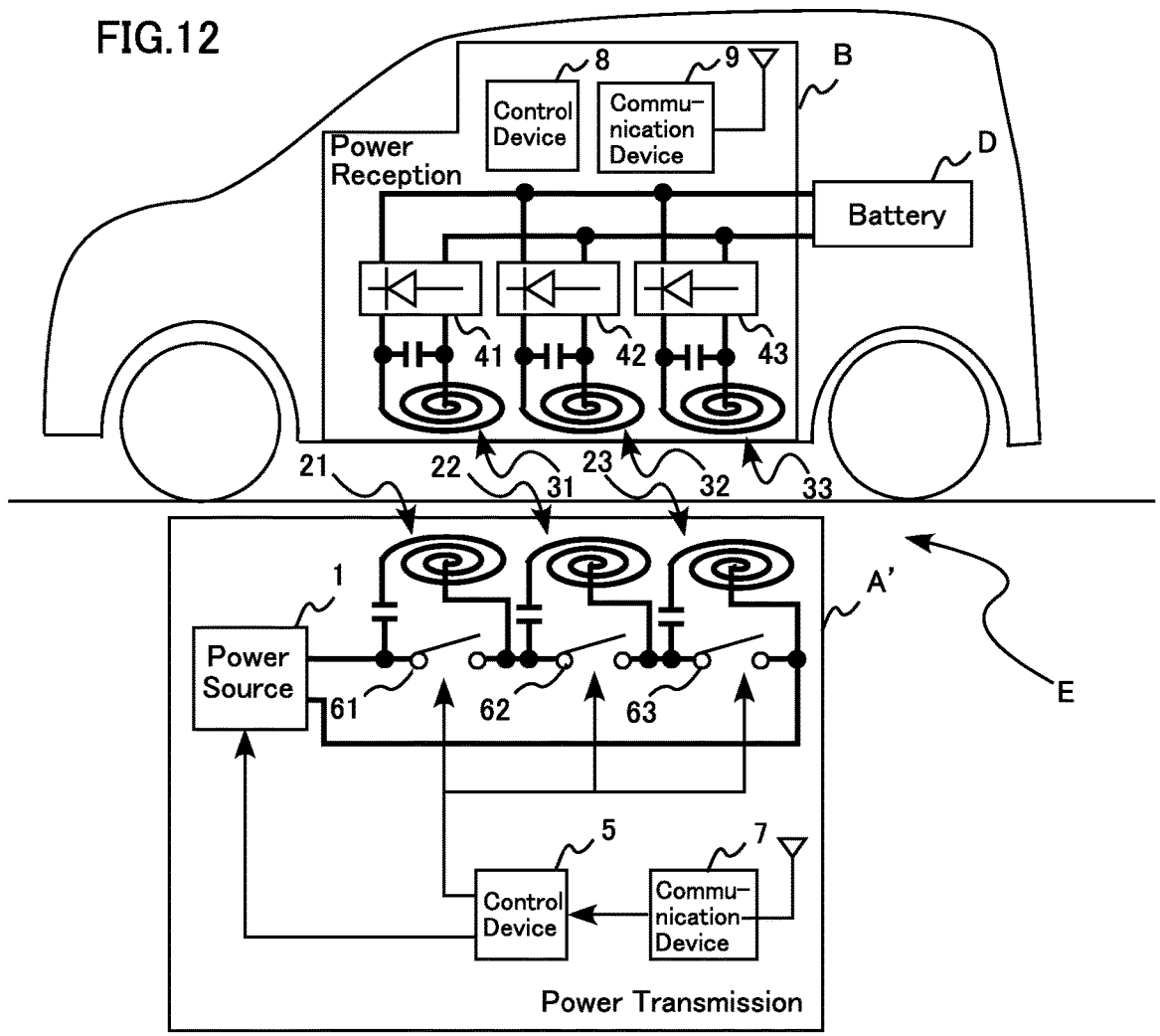
FIG. 12 is a diagram showing an overall configuration of a contactless power transmission system according to a fourth embodiment.
Figure 13:
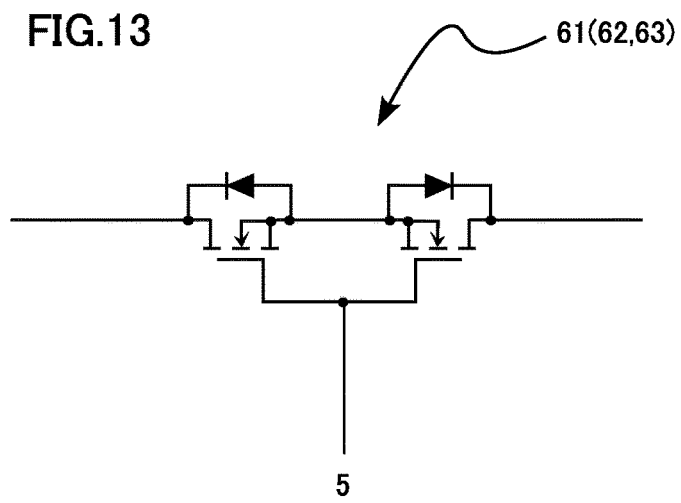
FIG. 13 is a circuit diagram showing an example of a switch.
Figure 14:
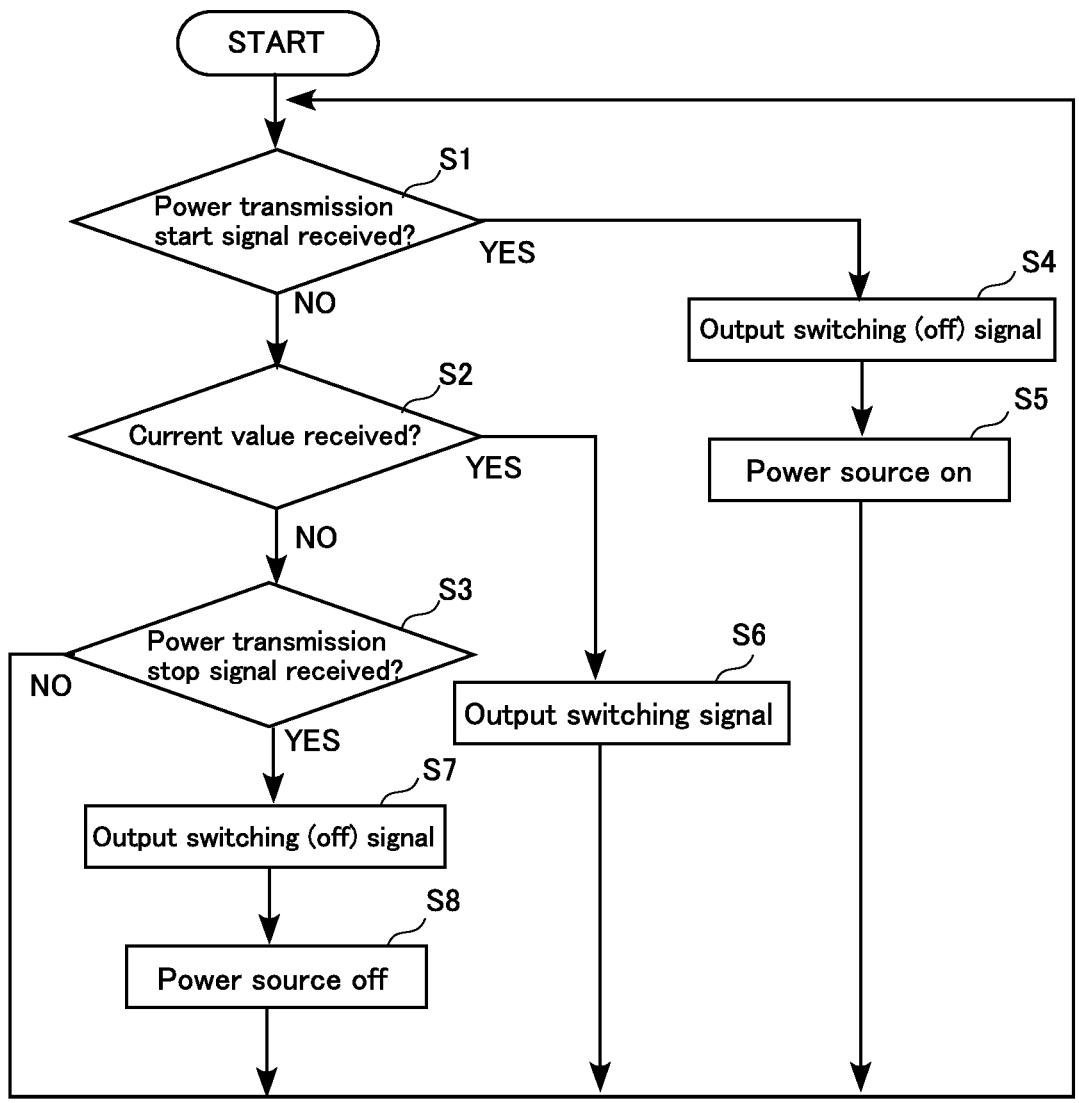
FIG. 14 is a flowchart for illustrating switching control processing.

FIGS. 12 to 14 are diagrams for illustrating a contactless power transmission system E according to a fourth embodiment. FIG. 12 is a diagram showing an overall configuration of the contactless power transmission system E. FIG. 13 is a circuit diagram showing an example of a switch. FIG. 14 is flowchart for illustrating switching control processing.

In FIG. 12, elements that are the same as or similar to those of the contactless power transmission system C (see FIG. 1) according to the first embodiment are denoted by the same reference signs. As shown in FIG. 12, the contactless power transmission system E differs from the contactless power transmission system C according to the first embodiment in that the power transmission apparatus A' includes switches 61, 62, and 63, a control device 5, and a communication device 7, and in that the power reception apparatus B includes a control device 8 and a communication device 9.

The switches 61 to 63 are respectively connected in parallel between the respective input terminals of the power transmission units 21 to 23. According to a switching signal input from the control device 5, the switch 61 (62, 63) switches between a state in which the high-frequency current flows in the power transmission unit 21 (22, 23), and a state in which the high-frequency current does not flow. That is, if the switching signal is an on signal (high-level signal), the switch 61 (62, 63) enters the conduction state, and the input terminals of the power transmission unit 21 (22, 23) are short-circuited, and therefore the high-frequency current from the high-frequency power source device 1 does not flow in the power transmission unit 21 (22, 23). On the other hand, if the switching signal is an off signal (low-level signal), the switch 61 (62, 63) enters the open state, and the high-frequency current from the high-frequency power source device 1 flows in the power transmission unit 21 (22, 23). Note that it is also possible to make it so that the high-frequency current flows in the power transmission unit 21 (22, 23) due to the switch 61 (62, 63) being put in the open state when the switching signal is the on signal, and so that the high-frequency current does not flow in the power transmission unit 21 (22, 23) due to the switch 61 (62, 63) being put in the conduction state in the case of the off signal.

In the present embodiment, as shown in FIG. 13, switches 61 to 63 obtained by connecting two MOSFETs (Metal Oxide Semiconductor Field Effect Transistors) in series with sources being connected in common are used. The source terminals of the two MOSFETs are connected to each other. The drain terminal of one MOSFET is connected to one input terminal of the power transmission unit 21 (22, 23), and the drain terminal of the other MOSFET is connected to the other input terminal. Also, the switching signal is input from the control device 5 to the gate terminals of both MOSFETs. In the case when the switching signal is the on signal, high-frequency current flows in the switch 61 (62, 63) and the switch 61 (62, 63) enters the conduction state.

Note that the switches 61 to 63 are not limited to using MOSFETs, and may use another semiconductor switch. Also, a solid-state relay (semiconductor relay) or a mechanical switch such as an electromagnetic contactor may be used. Also, another configuration may be used to switch between a state in which the high-frequency current flows in the power transmission units 21 to 23 and a state in which the high-frequency current does not flow.

The control device 5 controls the power transmission apparatus A'. According to the signal input from the communication device 7, the control device 5 outputs switching signals for switching the switches 61 to 63. Switching control will be described in detail later.

The communication device 7 performs wireless communication with the communication device 9 of the power reception apparatus B. The communication device 7 outputs the signal received from the communication device 9 to the control device 5. Note that there is no limitation on the communication method of the communication device 7 or the type of electromagnetic wave used.

The control device 8 controls the power reception apparatus B. If the electric automobile is located at a power reception position, the control device 8 causes the communication device 9 to transmit a power transmission start signal. The power transmission start signal is a signal for causing the power transmission apparatus A' to start power transmission. The power reception position is a position at which the position in the horizontal direction of the centers of the power reception coils Lr1 to Lr3 of the power reception apparatus B and the position in the horizontal direction of the centers of the power transmission coils Lt1 to Lt3 of the power transmission apparatus A' approximately coincide, and the power reception coils Lr1 to Lr3 and the power transmission coils Lt1 to Lt3 can be strongly magnetically coupled. Note that because power can be transmitted even if the positions do not completely coincide, the power reception position is a region with a predetermined width.

The electric automobile includes a sensor (not shown) for sensing that the electric automobile is located at a predetermined power reception position. Based on the input from the sensor, the control device 8 senses that the electric automobile is located at the power reception location. Note that there is no limitation on the method for sensing that the electric automobile is located at the power reception position. For example, it is possible to detect the position in the horizontal direction of the electric automobile and perform sensing based on the relationship between the position in the horizontal direction of the electric automobile and a pre-set position in the horizontal direction of the power transmission apparatus A'. Also, a mark indicating the power reception position may be provided at the position of the power transmission apparatus A' on the floor surface, and the mark may be detected based on an image captured by an image capturing sensor that is mounted on the electric automobile and captures an image of the floor surface. Also, the electric automobile may output a predetermined electromagnetic wave toward the floor surface and detect an electromagnetic wave reflected by a reflection member provided at the position of the power transmission apparatus A' on the floor surface, whereby it is sensed that the electric automobile is located at the power reception position.

Note that the sensor that detects that the electric automobile (power reception apparatus B) is located at the power reception position may be provided on the power transmission apparatus A' side instead of on the electric automobile side. In this case, it is sufficient that the control device 5 of the power transmission apparatus A' recognizes that the electric automobile is located at the power reception position based on the input from the sensor and performs processing that is the same as that performed upon receiving the power transmission start signal.

Also, if the battery D reaches a fully-charged state, the control device 8 causes the communication device 9 to transmit a power transmission stop signal for stopping power transmission. The electric automobile includes a voltage sensor (not shown) for detecting the charge voltage of the battery D, and the control device 8 judges that the battery D has reached the fully-charged state when the charge voltage detected by the voltage sensor is a predetermined threshold value or greater.

Also, according to the charge voltage of the battery D, the control device 8 causes the communication device 9 to transmit a current value signal indicating the necessary current value. The control device 5 of the power transmission apparatus A' switches the switches 61 to 63 according to the received current value signal, and thereby changes the size of the current input to the battery D. Note that the current value signal may be a specific current value or it may be a number indicating a current value.

The communication device 9 performs wireless communication with the communication device 7 of the power transmission apparatus A'. The communication device 9 transmits the signal input by the control device 8 to the communication device 7. Note that there is no limitation on the communication method of the communication device 9 or the type of electromagnetic wave used.

Next, control for switching the switches 61 to 63 will be described.

As described above, the current to be input to the battery D is obtained by adding together the currents output by the rectifying/smoothing circuits 41 to 43. Also, the power transmission units 21 to 23 are connected in series and connected to the high-frequency power source device 1, and the high-frequency power source device 1 is a constant current source. Accordingly, a constant current is input to the power transmission units 21 to 23. This is true regardless of whether or not current is flowing in the other power transmission units 21 to 23 according to the state of the switches 61 to 63. For example, the current that flows in the power transmission unit 21 is constant, regardless of whether or not current is flowing in the power transmission units 22 and 23. Also, if the sizes of the input currents of the power transmission units 21 to 23 are constant, the sizes of the output currents of the power reception units 31 to 33 are constant (see equation (9) above), and the currents output by the rectifying/smoothing circuits 41 to 43 are also constant. Accordingly, the states of the switches 61 to 63 are switched so as to switch whether or not currents flow in the power transmission units 21 to 23, whereby it is possible to switch the current input to the battery D.

The control device 5 switches the switches 61 to 63 according to a signal received from the power reception apparatus B. If the power transmission start signal is received by the communication device 7, the control device 5 outputs the switching signal to the switches 61 to 63 so that a pre-determined current can be output to the battery D. In the present embodiment, switching signals, which are off signals, are output to the switches 61 to 63 so that charging can be started at the maximum current. In this case, the switches 61 to 63 are in the open state (see FIG. 12). Next, the control device 5 starts up the high-frequency power source device 1. Specifically, a command is given so as to cause the power source control device 12 to output the high-frequency control signal S2. Accordingly, the high-frequency current from the high-frequency power source device 1 flows in the power transmission units 21 to 23. Accordingly, currents are output from all of the power reception units 31 to 33, and a current obtained by adding the currents together is output to the battery D. Note that setting the current during the start of charging to the maximum current is an example, and there is no limitation to this. For example, charging may be started by setting the switches 61 and 62 to the open state and setting the switch 63 to the conduction state, or the current at the time of starting charging may be set (the states of the switches 61 to 63 corresponding to the current may be set) according to the charge voltage of the battery D.

Also, if the current value signal has been input from the communication device 7, the control device 5 outputs the switching signals to the switches 61 to 63 according to the current value signal. For example, if the output current is to be reduced from the state in which the maximum current is output to the battery D (state in which all of the switches 61 to 63 are open), the control device 5 outputs a switching signal, which is an on signal, to the switch 63, for example. In this case, the switches 61 and 62 are in the open state, and the switch 63 is in the conduction state. Accordingly, the high-frequency current from the high-frequency power source device 1 flows in the power transmission units 21 and 22, but no longer flows in the power transmission unit 23. Accordingly, currents are output from the power reception units 31 and 32, and a current obtained by adding the currents together is output to the battery D. In other words, the current output to the battery D decreases by the amount that was being output from the power reception unit 33. If the power reception units 31 to 33 outputs currents of the same size, the current output to the battery D would be two-thirds of the maximum current due to the power reception unit 33 no longer outputting the current. Note that the switching signal, which is the on signal, may be output to the switch 61 or the switch 62. Furthermore, when the switch 62 enters the conduction state and the current no longer flows in the power transmission unit 22, the current output to the battery D is only the current from the power reception unit 31 and is one-third of the maximum current.

Note that the output currents of the power reception units 31 to 33 can be adjusted by adjusting the self-inductances of the power transmission coils Lt1 to Lt3 and the power reception coils Lr1 to Lr3 and the coupling coefficients of the coils (see equation (9) above). For example, if adjustment is performed such that the output current of the power reception unit 32 is one-half of the output current of the power reception unit 31 and the output current of the power reception unit 33 is one-fourth of the output current of the power reception unit 31, eight kinds of output currents can be switched between by switching the switches 61 to 63.

Also, if the power transmission stop signal has been input from the communication device 7, the control device 5 outputs the switching signal, which is the on signal, to the switches 61 to 63. In this case, the switches 61 to 63 enter the conduction state, and the high-frequency current from the high-frequency power source device 1 no longer flows in the power transmission units 21 to 23. Next, the control device 5 stops the driving of the high-frequency power source device 1. Specifically, a command to stop the output of the high-frequency control signal S2 is given to the power source control device 12.

FIG. 14 is a flowchart for illustrating switching control processing performed by the control device 5. The switching control processing is started when the power transmission apparatus A' starts up, and is executed while the power transmission apparatus A' is running.

First, it is determined whether or not the power transmission start signal have been received (step S1). If the power transmission start signal is not received (step S1: NO), it is determined whether or not the current value signal has been received (step S2). If the current value signal is not received (step S2: NO), it is determined whether or not the power transmission stop signal has been received (step S3). If the power transmission stop signal is not received (step S3: NO), the processing returns to step S1. That is, steps S1 to S3 are repeated until a signal is received.

If the power transmission start signal has been received (step S1: YES), switching signals, which are off signals, are output to the switches 61 to 63 (step S4). Accordingly, the switches 61 to 63 enter the open state. Next, the high-frequency power source device 1 is started up (step S5) and the processing returns to step S1. Specifically, a command is given so as to cause the power source control device 12 to output the high-frequency control signal S2. Accordingly, the high-frequency current from the high-frequency power source device 1 flows in the power transmission units 21 to 23. Accordingly, currents are output from all of the power reception units 31 to 33, and the currents are added together and output to the battery D. In other words, the battery D is charged with the maximum current.

If the current value signal was received in step S2 (step S2: YES), switching signals are output to the switches 61 to 63 according to the current value signal (step S6). Accordingly, the states of the switches 61 to 63 are switched, and the states in which the currents are output from the power reception units 31 to 33 are switched. Accordingly, the current output to the battery D is changed to the needed current.

If the power transmission stop signal was received in step S3 (step S3: YES), switching signals, which are on signals, are output to the switches 61 to 63 (step S7). Accordingly, the switches 61 to 63 enter the conduction state, and the high-frequency current from the high-frequency power source device 1 no longer flows in the power transmission units 21 to 23. Next, the driving of the high-frequency power source device 1 is stopped (step S8) and the processing returns to step S1. Specifically, a command to stop the output of the high-frequency control signal S2 is given to the power source control device 12. Note that the processing procedure for the switching control processing is not limited to this.

Figure 15A:
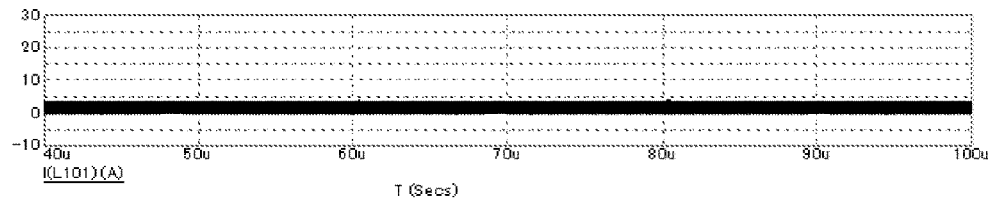
FIGS. 15A to 15D are diagrams showing waveforms when a simulation is performed based on the contactless power transmission system according to the fourth embodiment.
Figure 15B:
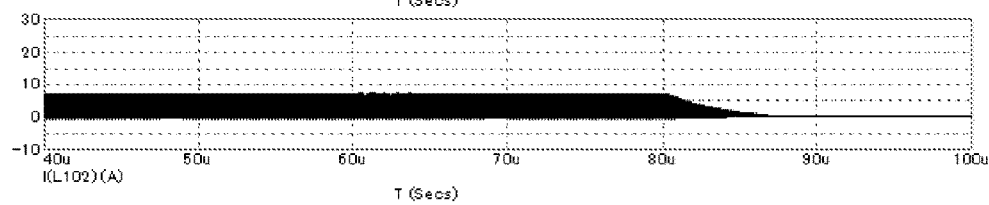
Figure 15C:
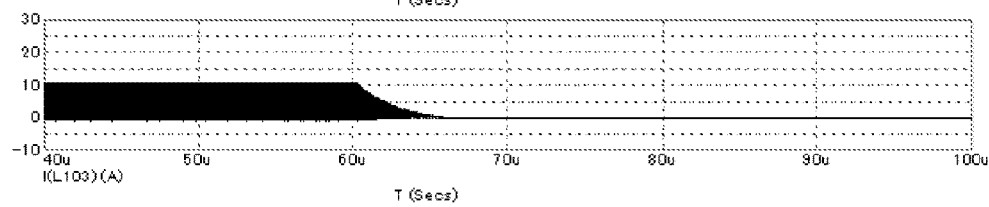
Figure 15D:
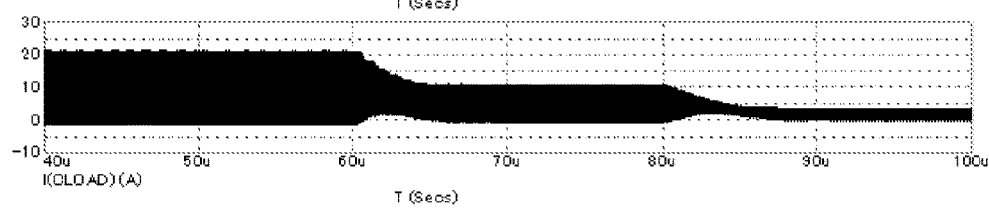

FIGS. 15A to 15D show waveforms at a time when, in the circuit shown in FIG. 12 (for the high-frequency power source device 1, please refer to the circuit shown in FIG. 3), only rectifying circuits are used as the rectifying/smoothing circuits 41 to 43, the battery D is replaced with a capacitor, and a simulation is performed. The DC voltage $V_{dc}$ output by the DC power source device 11 is set to 200 [V], and a square wave signal with a frequency f=13.56 [MHz] is used as the high-frequency control signal S2. Also, the self-inductances of the power transmission coils Lt1 to Lt3, the capacitances of the resonance capacitors Ct1 to Ct3, the self-inductances of the power reception coils Lr1 to Lr3, and the capacitances of the resonance capacitors Cr1 to Cr3 are respectively set to the same values. The coupling coefficient of the power transmission coil Lt1 and the power reception coil Lr1 is set such that k=0.2, the coupling coefficient of the power transmission coil Lt2 and the power reception coil Lr2 is set such that k=0.4, and the coupling coefficient of the power transmission coil Lt3 and the power reception coil Lr3 is set such that k=0.6. FIG. 15A shows a waveform of the output current of the rectifying/smoothing circuit 41, FIG. 15B shows a waveform of the output current of the rectifying/smoothing circuit 42, FIG. 15C shows a waveform of the output current of the rectifying/smoothing circuit 43, and FIG. 15D shows a waveform of the current input to the capacitor. When the simulation is started, the switches 61 to 63 are all in the open state, the switch 63 is switched to the conduction state 60 [μS] after the start, and the switch 62 is switched to the conduction state 80 [μS] after the start.

As shown in FIGS. 15A to 15D, the output currents increase in size in proportion to the coupling coefficient. Also, it was confirmed that the output currents are constant until the switches are switched and do not change even if another switch is switched. Also, as shown in FIG. 15C, after the switch 63 is switched to the conduction state, the output current of the rectifying/smoothing circuit 43 decreases to zero, and as shown in FIG. 15B, after the switch 62 is switched to the conduction state, the output current of the rectifying/smoothing circuit 42 decreases to zero. Also, as shown in FIG. 15D, the current input to the capacitor is the total of the output currents of the rectifying/smoothing circuits 41 to 43, and decreases after 60 [μS] and after 80 [μS] according to the changes in the output currents of the rectifying/smoothing circuits 42 and 43. That is, it was confirmed that the size of the current input to the capacitor is switched according to the switching of the switches 61 to 63.

Accordingly, in the fourth embodiment as well, an effect similar to that of the first embodiment can be achieved. Also, according to the fourth embodiment, the size of the output current can be switched by the control device 5 switching the switches 61 to 63 according to signals received from the power reception apparatus B. Accordingly, even if the high-frequency power source device 1 cannot change the output current, the size of the current output to the battery D can be changed.

In the fourth embodiment, a case was described in which the power reception apparatus B outputs a power transmission stop signal if the battery D enters a fully-charged state, but there is no limitation to this. For example, the power transmission stop signal may be output in the case where an operation button for stopping charging is provided and the operation button is pressed. Also, the power transmission stop signal may be output also in the case where some sort of abnormality occurs in the power reception apparatus B.

In the fourth embodiment, a case was described in which the power reception apparatus B outputs the power transmission start signal when the electric automobile is located at the power reception position, but there is no limitation thereto. For example, the power transmission start signal may be output in the case where an operation button for starting charging is provided and the operation button is pressed.

In the fourth embodiment, a case was described in which the power reception apparatus B determines whether or not the battery D is fully-charged, but there is no limitation to this. For example, the power reception apparatus B may periodically transmit the charge voltage of the battery D to the power transmission apparatus A' so that the power transmission apparatus A' determines whether or not the battery D is fully-charged. In this case the control device 5 may judge the current value required by the battery D according to the charge voltage and switch the switches 61 to 63. In the case of the present modified example, the power transmission apparatus A' determines whether or not the battery D is fully charged, and therefore there is no need to provide the control device 8 of the power reception apparatus B with a full-charge determination function.

In the above-described first to fourth embodiments, a case was described in which the power transmission apparatus A was provided embedded in a floor surface, but there is no limitation to this. For example, it is possible to provide only the power transmission coils embedded in the floor surface, and it is possible to arrange the power transmission coils on the floor surface and not embedded in the floor surface.

Figure 16A:
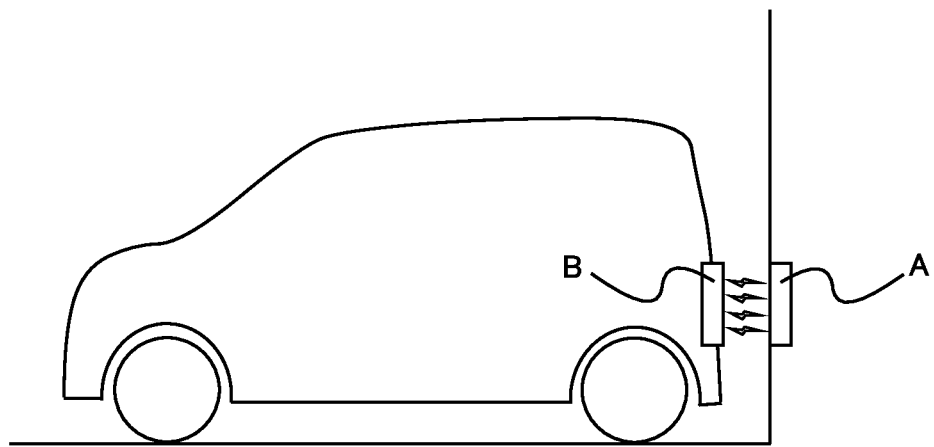
FIGS. 16A and 16B are diagrams for illustrating another embodiment of the contactless power transmission system according to the first to fourth embodiments.
Figure 16B:
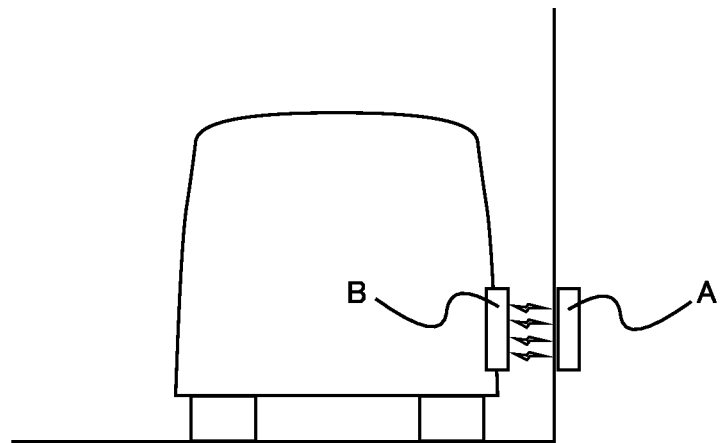

In the above-described first to fourth embodiments, a case was described in which the power transmission coils and the power reception coils were provided so as to be approximately parallel to the floor surface, but there is no limitation to this. For example, as shown in FIG. 16A, the power reception apparatus B may be arranged on the rear portion of the vehicle body, the power transmission apparatus A may be arranged on a wall surface of a garage, and the power transmission coils and power reception coils may be approximately perpendicular to the floor surface. Also, as shown in FIG. 16B, the power reception apparatus B may be arranged on a side surface of the vehicle body, the power transmission apparatus A may be arranged on a wall surface of a garage, and the power transmission coils and power reception coils may be approximately perpendicular to the floor surface. In short, it is sufficient that the power transmission coils and the power reception coils are arranged on the vehicle body and in the garage (parking area) respectively, such that the power transmission coils and the power reception coils can be arranged at positions that are approximately parallel and face each other.

In the first to fourth embodiments, as an example, a case was described in which the contactless power transmission system according to the present invention is used to charge a battery mounted in an electric automobile, but there is no limitation to this. For example, the contactless power transmission system according to the present invention can also be used to charge a battery or electrical double-layer capacitor of an AGV (automatic guided vehicle) used for conveying in a factory. Also, the present invention can be applied in the case of charging a battery of an electric tool or an electrical appliance such as a laptop personal computer. Also, the present invention can be applied in the case of, instead of charging a battery, directly supplying power to a load such as an electrical appliance connected to a power reception apparatus. In this case, it is possible to not include the smoothing circuit. Also, if the high-frequency power is to be supplied as-is to the load, it is also possible to not include the rectifying/smoothing circuit. Also, rectified DC power may be used after being converted into suitable AC power by an inverter circuit.

The contactless power transmission system according to the present invention is not limited to the above-described embodiments. Specific configurations of the units of the contactless power transmission system according to the present invention can be designed and modified in various ways.

The invention claimed is:
1. A contactless power transmission system comprising:
a power reception apparatus; and
a power transmission apparatus that transmits power contactlessly to the power reception apparatus,
wherein the power transmission apparatus includes: a high-frequency power source device that outputs a constant amplitude high-frequency current; and a plurality of power transmission units that are connected to each other in series and each include a power transmission coil and a resonance capacitor connected in series to the power transmission coil, the power reception apparatus includes a plurality of power reception units respectively associated with the plurality of power transmission units, wherein outputs of the plurality of power reception units are connected in parallel and are output to a single load, and the plurality of power reception units each include: a power reception coil magnetically coupled to the power transmission coil of a corresponding power transmission unit; and a resonance capacitor connected to the power reception coil, and the resonance capacitors of the power transmission units are connected to each other in series, and one of the resonance capacitors of the power transmission units is electrically disposed between two of the transmission coils of the power transmission units, wherein the power transmission apparatus includes:

switches that are respectively connected in parallel with the power transmission units between input terminals; and a control unit configured to switch the switches between an open state and a conduction state.

2. The system according to claim 1, wherein in each of the power reception units, the power reception coil and the resonance capacitor are connected in parallel.

3. The system according to claim 1, wherein in each of the power reception units, the power reception coil and the resonance capacitor are connected in series, and the power reception apparatus includes a plurality of voltage-current conversion circuits corresponding to the power reception units, respectively.

4. The system according to claim 3, wherein the voltage-current conversion circuits each include an inductor and a capacitor that have equal impedances at a frequency of the high-frequency current output by the high-frequency power source device, and that are arranged in a T shape or a π shape.

5. The system according to claim 3, wherein the voltage-current conversion circuits each include a transmission line connected in series to a corresponding one of the power reception units, and the transmission line has a length that is approximately one-fourth of a transmission wavelength in the transmission line at an output frequency of the high-frequency power source device.

6. The system according to claim 5, wherein the transmission line comprises a coaxial cable.

7. The system according to claim 1, wherein the power reception apparatus includes rectifying circuits corresponding to the power reception units, respectively, and outputs of the rectifying circuits are connected in parallel and are output to the single load.

8. The system according to claim 7, wherein the power reception apparatus includes a plurality of smoothing circuits that are connected to the rectifying circuits, respectively.

9. The system according to claim 1, wherein the high-frequency power source device includes:

a DC power source device that outputs a DC voltage;

a switching element that performs a switching operation based on an input high-frequency control signal;

an inductor that is connected in series between the DC power source device and the switching element; and a first resonance circuit that is connected in series between the power transmission units and a connection point of the switching element and the inductor, the resonant frequency of the first resonance circuit being a frequency of the high-frequency control signal.

10. The system according to claim 9, wherein the high-frequency power source device includes a second resonance circuit that is connected in parallel to the switching element, the resonant frequency of the second resonance circuit being a frequency that is twice the frequency of the high-frequency control signal.

11. The system according to claim 9, wherein instead of the inductor that is connected in series between the DC power source device and the switching element, the high-frequency power source device includes a transmission line with a length that is approximately one-fourth of the transmission wavelength at the output frequency of the high-frequency power source device.

12. The system according to claim 9, wherein the high-frequency power source device further includes a first transmission line and a second transmission line each having a first end connected to the connection point between the switching element and the first resonance circuit, the first transmission line has a length that is approximately one-eighth of the transmission wavelength in the first transmission line at the output frequency of the high-frequency power source device, the first transmission line having a second end that is open, and the second transmission line has a length that is approximately one-eighth of the transmission wavelength in the second transmission line at the output frequency of the high-frequency power source device, the second transmission line having a second end that is short-circuited.

13. The system according to claim 9, wherein the high-frequency power source device is constituted as a push-pull circuit.

14. The system according to claim 1, wherein each of the switches comprises two MOSFETS connected in series.

15. The system according to claim 1, wherein the power transmission apparatus includes a communication unit that transmits information indicating a current value required by the single load to the control unit of the power transmission apparatus, and the power transmission apparatus includes a control unit that switches states of the switches according to received information indicating the current value.

16. The system according to claim 15, wherein the single load is a power storage device, and the power reception apparatus supplies received power to the power storage device, the power reception apparatus transmits a power transmission stop signal for stopping power transmission to the control unit of the power transmission apparatus when the power storage device enters a fully-charged state, and the control unit of the power transmission apparatus switches all of the switches to conduction state based on the power transmission stop signal.

17. The system according to claim 15, wherein the single load is a power storage device, and the power reception apparatus supplies received power to the power storage device, the power reception apparatus transmits charge voltage information of the power storage device to the control unit of the power transmission apparatus, and the control unit of the power transmission apparatus switches all of the switches to conduction state based on the charge voltage information.

18. The system according to claim 1, wherein the plurality of power transmission units are connected to each other by transmission lines with a length that is approximately equal to an integer times one-half of the transmission wavelength at the output frequency of the high-frequency power source device, and the power reception apparatus is arranged in a vehicle, and the power transmission apparatus is arranged in a floor surface.

19. The system of claim 1, wherein the power transmission coils include a first power transmission coil and a second power transmission coil, the power reception coils include a first power reception coil and a second power reception coil that are magnetically coupled to the first power transmission coil and the second power transmission coil, respectively, and a first coupling coefficient of the first power transmission coil and the first power reception coil is different from a second coupling coefficient of the second power transmission coil and the second power reception coil.

* * * * *